US011250010B2

(12) United States Patent
Mueller

(10) Patent No.: US 11,250,010 B2
(45) Date of Patent: Feb. 15, 2022

(54) DATA ACCESS GENERATION PROVIDING ENHANCED SEARCH MODELS

(71) Applicant: SAP SE, Walldorf (DE)

(72) Inventor: Thomas Mueller, Wiesloch (DE)

(73) Assignee: SAP SE, Walldorf (DE)

( * ) Notice: Subject to any disclaimer, the term of this patent is extended or adjusted under 35 U.S.C. 154(b) by 95 days.

(21) Appl. No.: 16/688,349

(22) Filed: Nov. 19, 2019

(65) Prior Publication Data

US 2021/0149898 A1    May 20, 2021

(51) Int. Cl.
| | |
|---|---|
| G06F 16/00 | (2019.01) |
| G06F 16/2458 | (2019.01) |
| G06F 16/28 | (2019.01) |
| G06F 16/25 | (2019.01) |
| G06F 16/215 | (2019.01) |
| G06F 16/2457 | (2019.01) |

(52) U.S. Cl.
CPC ........ *G06F 16/2465* (2019.01); *G06F 16/215* (2019.01); *G06F 16/24573* (2019.01); *G06F 16/258* (2019.01); *G06F 16/284* (2019.01)

(58) Field of Classification Search
None
See application file for complete search history.

(56) References Cited

U.S. PATENT DOCUMENTS

| | | | |
|---|---|---|---|
| 7,506,145 B2 | 3/2009 | Zenz et al. | |
| 7,797,522 B2 | 9/2010 | Zenz et al. | |
| 7,810,067 B2 | 10/2010 | Kaelicke et al. | |
| 7,870,538 B2 | 1/2011 | Zenz et al. | |
| 8,396,795 B2 | 3/2013 | Mueller et al. | |
| 8,458,189 B1 | 6/2013 | Ludwig et al. | |
| 8,756,273 B2 | 6/2014 | Buchmann et al. | |
| 8,849,894 B2 | 9/2014 | Mueller et al. | |
| 9,031,976 B2 | 5/2015 | Seufert et al. | |
| 9,645,845 B2 | 5/2017 | Marwinski et al. | |
| 10,365,896 B2 | 7/2019 | Finke et al. | |
| 2005/0049946 A1 | 3/2005 | Mueller et al. | |
| 2005/0049947 A1 | 3/2005 | Mueller et al. | |
| 2007/0156383 A1 | 7/2007 | Zenz et al. | |
| 2007/0156715 A1 | 7/2007 | Mueller et al. | |
| 2007/0156717 A1 | 7/2007 | Zenz et al. | |
| 2007/0168965 A1 | 7/2007 | Zenz et al. | |
| 2009/0089785 A1 | 4/2009 | Marwinski et al. | |
| 2013/0138418 A1 | 5/2013 | Finke et al. | |
| 2013/0138670 A1 | 5/2013 | Ludwig et al. | |

(Continued)

*Primary Examiner* — Bai D Vu

(74) *Attorney, Agent, or Firm* — Klarquist Sparkman, LLP

(57) ABSTRACT

Data transformation and access generation for data sets is provided herein. Access generation for a data set can include generating one or more new access modes for the data set. An access mode can include a transformed data set and one or more search definitions or a search model for the transformed data set. Transforming the data set can include transforming a linear data set to a relational data set by determining structural information for the linear data, generating a relational schema based on the structural information, and loading data from the linear data set into the generated relational data structure. Transforming the data set can include sanitizing the data, restructuring the relational data set based on functional dependencies, and reformatting the data set. One or more search definitions can be generated for the relational data. A search model can be generated based on the search definitions.

19 Claims, 14 Drawing Sheets

(56) References Cited

U.S. PATENT DOCUMENTS

| | | |
|---|---|---|
| 2013/0138719 A1 | 5/2013 | Buchmann et al. |
| 2013/0166550 A1 | 6/2013 | Buchmann et al. |
| 2013/0166563 A1 | 6/2013 | Mueller et al. |
| 2013/0218762 A1 | 8/2013 | Mueller et al. |
| 2014/0149450 A1 | 5/2014 | Seufert et al. |

420

430

```
@AbapCatalog.sqlViewName: 'ESH_U_STUDENT'
define view ESH_S_STUDENT
as select from ESH_N_STUDENT
{
STUD_ID,
FIRST_NAME,
LAST_NAME,
DOB,
CITY_OF_BIRTH,
UNIVERSITY,
_TO_CITY.CITY_ID as CITY_CITY_ID,
_TO_CITY.NAME as CITY_NAME,
_TO_CITY.MAYOR as CITY_MAYOR,
_TO_CITY.POPULATION as CITY_POPULATION,
_TO_CITY.ELEVATION as CITY_ELEVATION,
_TO_CITY.STATE as CITY_STATE,
_TO_CITY._TO_STATE.STATE_CODE as CITY_STATE_STATE_CODE,
_TO_CITY._TO_STATE.NAME as CITY_STATE_NAME,
_TO_CITY._TO_STATE.GOVERNOR as CITY_STATE_GOVERNOR,
_TO_CITY._TO_STATE.POPULATION as CITY_STATE_POPULATION,
_TO_CITY._TO_STATE.AREA as CITY_STATE_AREA,
_TO_CITY._TO_STATE.CAPITAL as CITY_STATE_CAPITAL,
_TO_CITY._TO_STATE._TO_CAPITAL.CITY_ID as CITY_STATE_CAPITAL_CITY_ID,
_TO_CITY._TO_STATE._TO_CAPITAL.NAME as CITY_STATE_CAPITAL_NAME,
_TO_CITY._TO_STATE._TO_CAPITAL.MAYOR as CITY_STATE_CAPITAL_MAYOR,
_TO_CITY._TO_STATE._TO_CAPITAL.POPULATION as CITY_STATE_CAPITAL_POPULATION,
_TO_CITY._TO_STATE._TO_CAPITAL.ELEVATION as CITY_STATE_CAPITAL_ELEVATION,
_TO_CITY._TO_STATE._TO_CAPITAL.STATE as CITY_STATE_CAPITAL_STATE,
_TO_UNIVERSITY.U_ID as UNI_U_ID,
_TO_UNIVERSITY.NAME as UNI_NAME,
_TO_UNIVERSITY.PRESIDENT as UNI_PRESIDENT,
_TO_UNIVERSITY.ZIP_CODE as UNI_ZIP_CODE,
_TO_UNIVERSITY.CITY as UNI_CITY,
_TO_UNIVERSITY._TO_CITY.CITY_ID as UNI_CITY_CITY_ID,
_TO_UNIVERSITY._TO_CITY.NAME as UNI_CITY_NAME,
_TO_UNIVERSITY._TO_CITY.MAYOR as UNI_CITY_MAYOR,
_TO_UNIVERSITY._TO_CITY.POPULATION as UNI_CITY_POPULATION,
_TO_UNIVERSITY._TO_CITY.ELEVATION as UNI_CITY_ELEVATION,
_TO_UNIVERSITY._TO_CITY.STATE as UNI_CITY_STATE,
_TO_UNIVERSITY._TO_CITY._TO_STATE.STATE_CODE as UNI_CITY_STATE_STATE_CODE,
_TO_UNIVERSITY._TO_CITY._TO_STATE.NAME as UNI_CITY_STATE_NAME,
_TO_UNIVERSITY._TO_CITY._TO_STATE.GOVERNOR as UNI_CITY_STATE_GOVERNOR,
_TO_UNIVERSITY._TO_CITY._TO_STATE.POPULATION as UNI_CITY_STATE_POPULATION,
_TO_UNIVERSITY._TO_CITY._TO_STATE.AREA as UNI_CITY_STATE_AREA,
_TO_UNIVERSITY._TO_CITY._TO_STATE.CAPITAL as UNI_CITY_STATE_CAPITAL
}
```

```
@AbapCatalog.sqlViewName: 'ESH_U_STUDENT'
@UI.headerInfo.typeNamePlural: 'Students'
@UI.headerInfo: { title: {value: 'FIRST_NAME'}, description: {value: 'STUD_ID'} }
@Search.searchable: true
@EnterpriseSearch.enabled: true
@ObjectModel.semanticKey: ['STUD_ID']
define view ESH_S_STUDENT
as select from ESH_N_STUDENT
{
@EndUserText.label: 'Student ID'
@EnterpriseSearch.filteringAttribute: { default, displayPosition: 1 }
STUD_ID,
@EndUserText.label: 'First Name'
@UI.identification: { position: 1 }
@Search.defaultSearchElement: true
@EnterpriseSearch.defaultValueSuggestElement: true
@Search.ranking: #HIGH
FIRST_NAME,
@EndUserText.label: 'Last Name'
@UI.identification: { position: 2 }
@Search.defaultSearchElement: true
@EnterpriseSearch.defaultValueSuggestElement: true
@Search.ranking: #HIGH
LAST_NAME,
@EndUserText.label: 'Date of Birth'
@UI.identification: { position: 3 }
@EnterpriseSearch.filteringFacet: { default, displayPosition: 4 }
DOB,
@EndUserText.label: 'Place of Birth'
@UI.identification: { position: 4 }
@EnterpriseSearch.filteringFacet: { default, displayPosition: 2 }
@Search.defaultSearchElement: true
@Search.ranking: #MEDIUM
_TO_CITY.NAME as CITY_NAME,
@EndUserText.label: 'Birthplace's Mayor'
@UI.identification: { position: 11 }
@Search.defaultSearchElement: true
@Search.ranking: #LOW
_TO_CITY.MAYOR as CITY_MAYOR,
@EndUserText.label: 'State of Birth'
@UI.identification: { position: 8 }
@EnterpriseSearch.filteringFacet: { default, displayPosition: 3 }
@Search.defaultSearchElement: true
@Search.ranking: #MEDIUM
_TO_CITY._TO_STATE.NAME as CITY_STATE_NAME,
@EndUserText.label: 'Governor of State of Birth'
@UI.identification: { position: 10 }
@Search.defaultSearchElement: true
@Search.ranking: #LOW
_TO_CITY._TO_STATE.GOVERNOR as CITY_STATE_GOVERNOR,
@EndUserText.label: 'Capital of State of Birth'
@UI.identification: { position: 9 }
_TO_CITY._TO_STATE._TO_CAPITAL.NAME as CITY_STATE_CAPITAL_NAME,
@EndUserText.label: 'University'
@UI.identification: { position: 5 }
@EnterpriseSearch.filteringFacet: { default, displayPosition: 1 }
@Search.defaultSearchElement: true
@Search.ranking: #HIGH
_TO_UNIVERSITY.NAME as UNI_NAME,
@EndUserText.label: 'President of University'
@UI.identification: { position: 7 }
_TO_UNIVERSITY.PRESIDENT as UNI_PRESIDENT,
@EndUserText.label: 'City of University'
@UI.identification: { position: 6 }
@Search.defaultSearchElement: true
@Search.ranking: #MEDIUM
_TO_UNIVERSITY._TO_CITY.NAME as UNI_CITY_NAME,
@EndUserText.label: 'Governor responsible for University'
@UI.identification: { position: 12 }
@Search.defaultSearchElement: true
@Search.ranking: #LOW
_TO_UNIVERSITY._TO_CITY._TO_STATE.GOVERNOR as UNI_CITY_STATE_GOVERNOR
}
```

FIG. 4F

DATA ACCESS GENERATION PROVIDING ENHANCED SEARCH MODELS

BACKGROUND

The amount of data in database and enterprise systems continues to increase at a high pace. However, not all data is stored in effective or efficient data structures or files. For example, some data is stored in legacy formats or systems, while other data may be stored in temporary formats, or in formats easily generated at the time of data collection. Such data files may not be effective for accessing and using the data, such as for searching. Further, such data files may isolate the stored data from data in more useful or effective formats, further limiting its availability and use. Making such data available for use can be time-consuming and difficult, often requiring manual analysis by skilled developers or users, which can be prohibitively expensive. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of generating enhanced data access is provided herein. A linear data set can be identified. Structural information for the linear data set can be determined. Database tables can be generated based on the structural information. The database tables can be loaded with data from the linear data set to form relational data. The database tables can be restructured based on functional dependencies between fields in the database tables. Queries can be generated for the respective database tables. A primary query of the generated queries can be identified. An upper query can be generated based on the primary query. The upper query can be annotated with execution information for one or more fields in the upper query. The upper query can be made available via a software tool to provide access to the relational data.

One or more non-transitory computer-readable storage media storing computer-executable instructions for causing a computing system to perform a method of data access generation are provided herein. A data access generation request can be received. The request can include identifiers for one or more data files storing linear data. The linear data can be transformed into relational data. The relational data can be sanitized. The relational data can be restructured. The relational data can be converted into a target format. One or more search definitions can be generated based on the relational data. The search definitions can provide access to the relational data. A search model can be generated based on the one or more search definitions. The search model can provide enhanced access to the relational data. The relational data, the one or more search definitions, and the search model can be stored. The search model can be made available as an access mode for the relational data.

A system comprising of data access generation is provided herein. A request to transform linear data can be received. The request can include identifiers for one or more data files having the linear data. The linear data can be converted into relational data. Converting the linear data can include identifying structural information of the linear data based on the one or more data files, selecting one or more key elements based on the structural information, generating one or more relational data objects of the relational data corresponding to the one or more key elements, and populating the one or more relational data objects of the relational data with the linear data of the one or more data files based on the structural information. The relational data can be stored. The relational data can be sanitized. Sanitizing the relational data can include correcting invalid data values in the relational data, and correcting extraneous characters in data values in the relational data. The relational data can be restructured. Restructuring the relational data can include identifying one or more functional dependencies in the relational data, generating one or more additional relation data objects of the relational data based on the one or more functional dependencies, and transferring data from the one or more relational data objects to the one or more additional relational data objects based on the functional dependencies. The relational data can be converted into a target format by altering the format of one or more data values in the relational data based on the target format. One or more search definitions can be generated based on the relational data in the target format. The one or more search definitions can respectively correspond to the one or more relational data objects and the one or more additional relational data objects. The one or more search definitions can be stored. A search model can be generated based on the one or more search definitions. The search model can include an upper search definition aggregating the one or more search definitions and one or more search annotations for executing the search model. The search model can be stored.

The foregoing and other objects, features, and advantages of the invention will become more apparent from the following detailed description, which proceeds with reference to the accompanying figures.

BRIEF DESCRIPTION OF THE DRAWINGS

FIG. 4E is a continuation of the example shown in FIGS. 4C-D, illustrating an upper search definition.

FIG. 4F is a continuation of the example shown in FIGS. 4C-E, illustrating an annotated upper search definition.

DETAILED DESCRIPTION

Example 1—Overview

Figure 1:
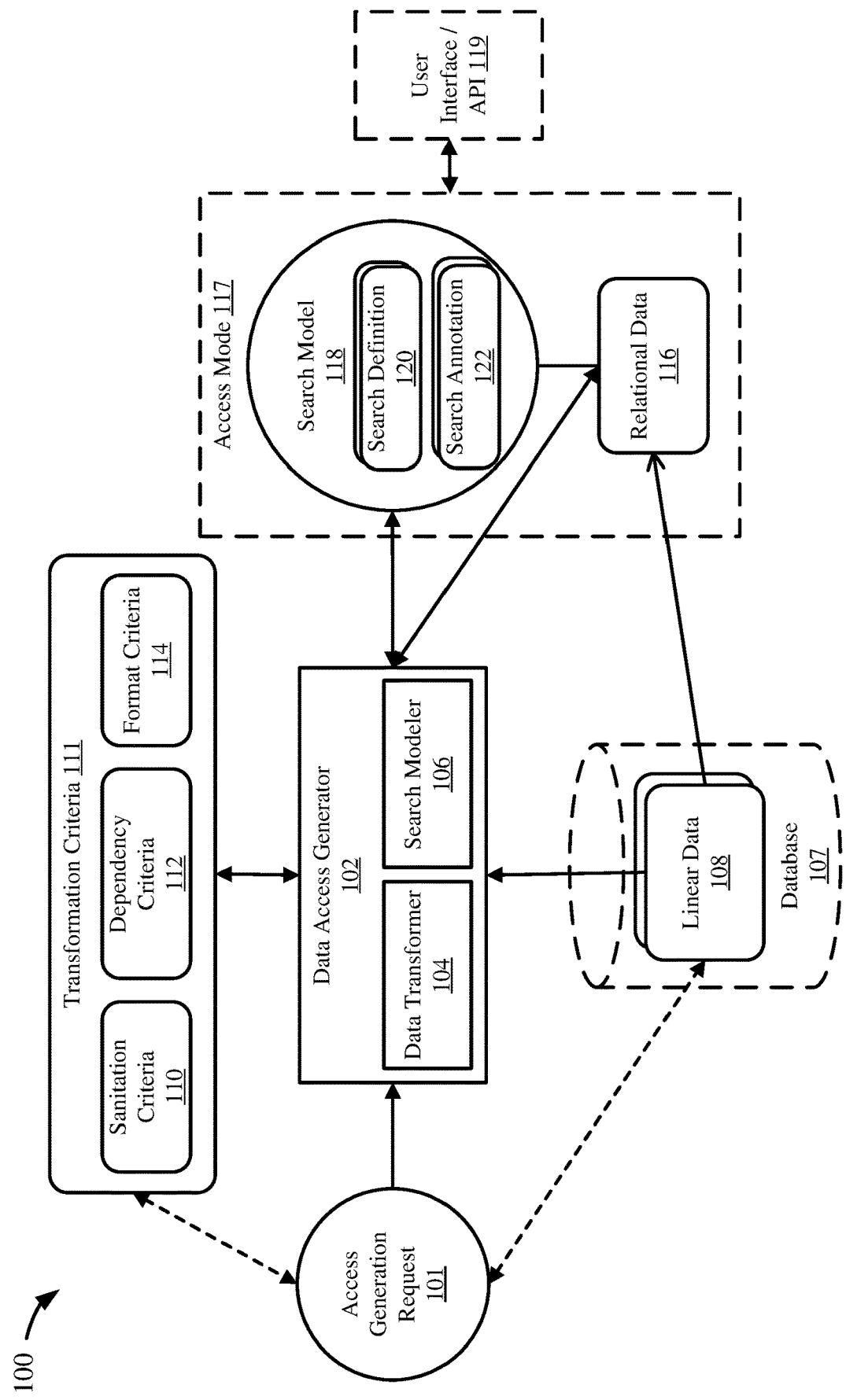
FIG. 1 is a block diagram of an example system implementing data access generation.

The ever-increasing amount of incoming data and transformation of the enterprise into a data-driven world creates many difficulties as data is indeed accumulated. In particular, accessing relevant data by searching is a key component of modern data usage. However, not all data is available in a format that is readily or efficiently accessible through current software tools or interfaces. Further, some data formats are inefficient, storing data redundantly which increases the amount of storage space used (which can also increase the cost or efficiency to access the data). The structure of linear data compared to relational data can be significant, making transformation difficult. Generally, this leads to a failure to transform linear data into relational data, thus limiting the access or usability of the linear data, which can especially deprive data owners of valuable data for use in detailed analyses.

The data access generation functionality described herein can help alleviate these concerns of linear raw data by transforming the linear data set into a relational data set and generating search definitions and a search model based on the relational data set. The transformed data and the search model/definitions can then be used for improved access to the data set, either by users through a user interface or by a system through an API. Further advantages of data access generation, as described herein, include providing a (semi-)automated technique of transforming redundant linear data (e.g. XML-based raw data) into non-redundant relational data (e.g. table-based data) and interconnected search definitions with a search model overlay, helping to save the investments that have been taken with respect to the linear data by making the data consumable for existing search software (e.g. SAP Enterprise Search™ technology), accelerating the move to new search technology by providing more search-related content in a search-oriented data structure (e.g. relational model data), avoiding or reducing mistakes/errors that would occur if the linear raw data would be transformed manually into a relational format, increasing user satisfaction by minimizing the amount of manual work and cost to convert and access data, increase user satisfaction by making more data available for existing search software and tools, increase search quality and reduce database storage size by freeing the data from redundancy (e.g. reducing the resource footprint of the data set), avoiding or reducing the need for a separate/additional search technology for the linear data set, supporting to achieve the goal of a single data format for a user (which can facilitate all kinds of data analyses), and so on.

Data access generation, as described herein, can generally include generating a new access mode for a target data set (e.g. a linear data set, or other data set in a legacy format). An access mode can include a transformed data set, which can generally be in a relational structure such as based on a generated relational schema, and a search model (and/or one or more search definitions). Thus, the linear data can become available for user or automatic use through the relational data and/or the search model (e.g. the access mode). Thus, the old data can be searched in new ways, making use of current searching and analytical tools.

Searching can be accomplished through search models, which can embrace most or all information necessary to execute a successful search. For example, such information can include: request fields (e.g. in which columns a search term should or could be found), freestyle search request fields (e.g. which columns to consider in a freestyle or user-defined search), relevance of freestyle search request fields (e.g. degree of relevancy of a hit in a given column), facetted search request fields (e.g. which columns are relevant to a facetted search), advanced search request fields (e.g. which columns should be enabled for an advanced search), auto-completion request fields (e.g. for which columns the auto-complete feature should be provided), response fields (e.g. which columns should be a part of the search result), title response fields (e.g. which columns are relevant to the title of a search hit), authorization checks (e.g. which authorizations are requested to access which data), boosts (e.g. which hits should be boosted, promoted, or highlighted), field semantics (e.g. which search configuration to use based on semantics related to the search fields or search), or others, in any combination thereof. A search model can include many different searches of many different types, which can work together, either directly, indirectly (e.g. by subject matter or conceptually).

Data access generation functionality, and other data transformation and search generation functionality as described herein, can be provided in integrated development environments (IDEs), data management software, data integration software, ERP software, database or database management systems, ETL software, or other data transfer or access software systems. Examples of such tools are: SAP Enterprise Search™ technology, SAP NetWeaver Application Server™ technology, SAP S/4HANA™ technology, SAP S/4HANA Cloud™ technology, SAP S/4HANA On Premise™ technology, all by SAP SE of Walldorf, Germany.

Example 2—Example System that Implements Data Access Generation Functionality

FIG. 1 is a block diagram of an example system 100 implementing data access generation functionality. A data access generator 102 can automatically generate a new access mode 117 for a data set (e.g. linear data 108). The data access generator 102 can provide data access generator functionality directly, or it may be integrated in an application, such as a database management system (DBMS) or an integrated development environment (IDE), or with a user interface 119.

The data access generator 102 can receive an access generation request 101. The request 101 can be a function call or can be made through an API or other interface (e.g. 119) of the data access generator 102. In some embodiments, the request 101 can be a trigger which initiates functionality in the data access generator 102, such as based on an input or a context change (e.g. in a DBMS or an IDE).

The access generation request 101 can include one or more variables for generating the requested access mode 117, which can include the relational data 116 and search model 118. For example, the request 101 can include a reference to a linear data set 108 for which to generate the new access mode 117. Such a reference can include one or more data file identifiers, or a location(s) for the linear data 108, such as a database 107 storing the linear data or linear data files (and can further include identifiers or locations for such specific data sets within the database), or a combination thereof. In some embodiments, the request 101 can include the linear data 108 itself, such as stored in a data structure or file.

Further, the access generation request 101 can include a reference to transformation criteria 111, or to the separate types of transformation criteria 110, 112, 114, which can include an identifier or location for the transformation criteria (or for the separate types). In some embodiments, the request 101 can include some or all of the transformation criteria 111, such as stored in a data structure or file(s).

In some embodiments, request 101 inputs, such as the linear data set 108 and/or the transformation criteria 111, can be determined based on a context of the data access generator 102 when it receives the request. For example, if the request 101 is generated in a DBMS or an IDE to trigger the data access generator 102, such inputs 108, 111 (and/or other inputs) can be obtained for the request or the data access generator by the context of the request in the DBMS or IDE.

The access generation request 101 can also include one or more configurable configuration settings or options, such as a location for storing the access mode 117, an indicator for displaying the results (e.g. 116, 118) or a report of the process, a mode of operation for performing data transformation and/or search model generation, or one or more threshold scores or values for data transformation processes or search modeling processes.

The data access generator 102 can access linear data 108 for which it can generate an access mode 117, as described herein. The linear data 108 can include one or more sets or files of linear data, which can generally be related data, such as by sharing a similar or same schema. The linear data 108 can be obtained from a database 107, or other data location, such as based on the access generation request 101. The linear data 108 can include one or more data records, which can further include redundant or duplicated data.

The data access generator 102 can analyze the linear data 108, such as through the data transformer 104 and the search modeler 106, to generate a new access mode 117 for the data stored as the linear data 108. The access mode 117 can include relational data 116 and a search model 118. The search model 118 can include one or more search definitions 120, which can be used to search or otherwise access the relational data 116, and one or more search annotations 122, which can be used to execute the search model 118 and/or the search definitions 120.

The relational data 116 can be generated by the data access generator 102, such as through the data transformer 104. The data transformer 104 can transform the linear data 108 into the relational data 116, which can include generating a relational data structure or schema based on the linear data 108, and populating the relational data structure or schema with the data values from the linear data.

The search model 118 can be generated by the data access generator 102, such as through the search modeler 106. The search modeler 106 can access the relational data 116, and generate one or more search definitions 120 and search annotations 122 based on the relational data 116 (e.g. the schema for the relational data). In this way, a search model 118 can be automatically generated for the relational data 116, which was based on the linear data 108. Separately or together, the relational data 116 and the search model 118 can provide an access mode 117 to the data originally stored as the linear data 108.

The data access generator 102 can use the transformation criteria 111 to generate the access mode 117 based on the linear data 108. For example, the data access generator 102 can use sanitation criteria 110 to sanitize or clean the data values from the linear data 108 as it is populated or loaded into the relational data 116. Further, the data access generator 102 can use the dependency criteria 112 to generate the relational structure or schema for the relational data 116, such as based on the data values of the linear data 108 (e.g. that have been or will be loaded into the relational data). Further, the data access generator 102 can use format criteria 114 to update or reformat the data values in the relational data 116, such as after they have been loaded from the linear data 108. The transformation criteria 111 can be used in conjunction with the linear data 108 (e.g. the data values or a schema or structure of the linear data) to generate the access mode 117.

The access mode 117 can be provided or otherwise made available through a user interface/API 119, such as by displaying the search model 118 or search options based on the search model (and/or components of the search model, such as the search definitions 120), displaying the relational data 116, or by providing a file or data structure(s) of, or generally access to, the relational data via an interface, such as in a return from a service or function call, or a messaging system. A results report or status indicator of the data access generation process can be provided in the user interface/API 119 as well.

In practice, the systems shown herein, such as system 100, can vary in complexity, with additional functionality, more complex components, and the like. For example, there can be additional functionality within the data access generator 102. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the instructions for implementing the data access generator 102, the input, output, and intermediate data of running the data access generator, or the database 107 or the user interface/API 119, and the like can be stored in one or more computer-readable storage media or computer-readable storage devices. The technologies described herein can be generic to the specifics of operating systems or hardware and can be applied in any variety of environments to take advantage of the described features.

Figure 2:
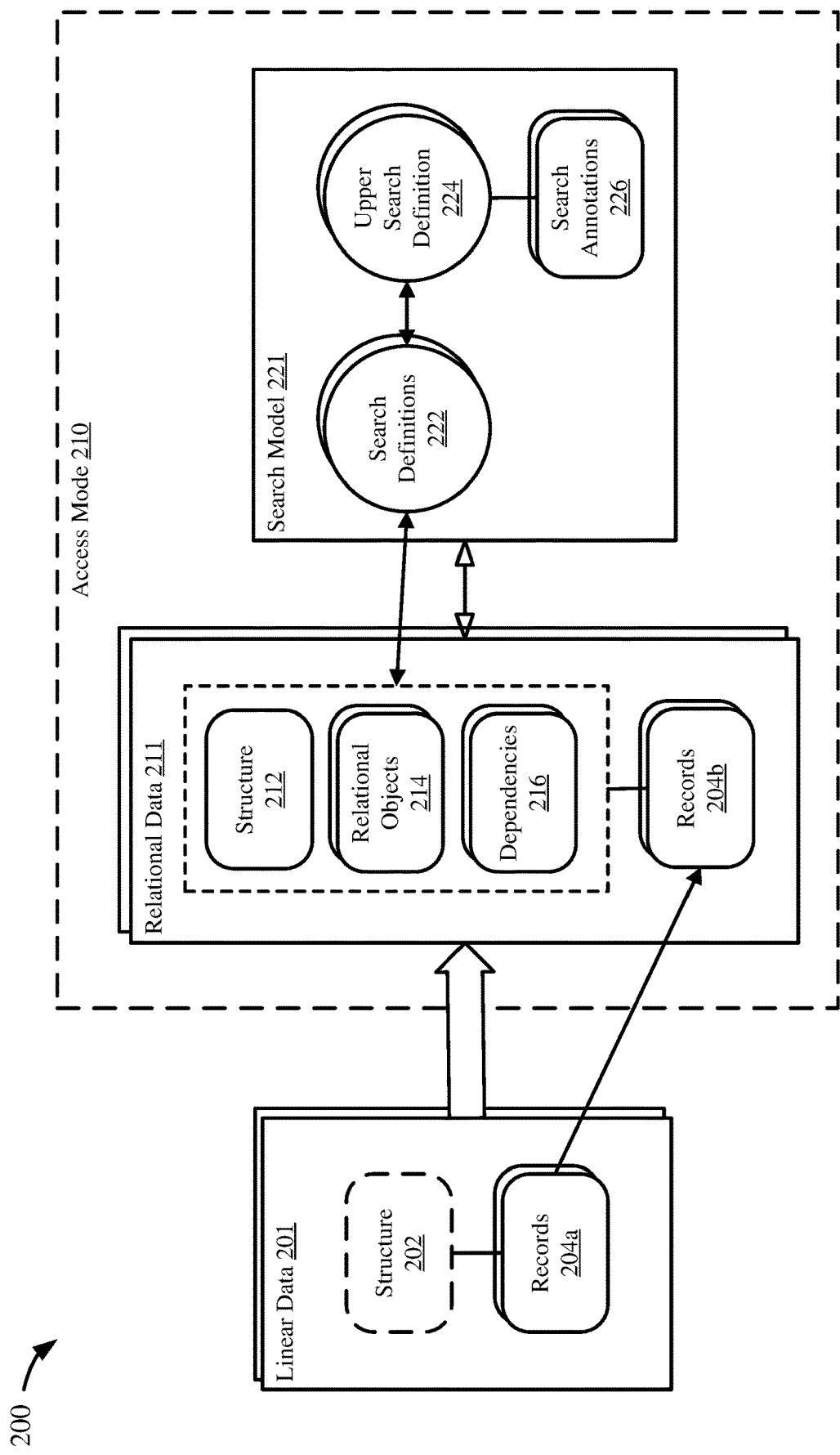
FIG. 2 is an entity diagram depicting a linear data set, a relational data set, search definitions, and a search model arrangement.

Example 3—Example Linear Data Set, Relational Data Set, Search Definitions, and Search Model Arrangement FIG. 2 is an entity diagram depicting a linear data set, a relational data set, search definitions, and a search model arrangement 200. A linear data set 201 can include a structure 202 and one or more records 204a. The structure 202 can be the structure or schema for storing the records 204a. The structure 202 can be explicitly defined, such as in a schema file or portion of the linear data 201, or can be implicitly defined based on the records 204a (e.g. a structural or schematic definition 202 for the linear data 201 may not be stored explicitly in the linear data). The records 204a include the data values of the linear data 201.

The relational data 211 can include a structure 212, one or more relational objects 214, one or more dependencies 216, and one or more records 204b. The structure 212 can be the structure or schema for storing the records 204b. For example, the structure 212 can be a relational schema for a database. The relational objects 214 can be entities in the relational data 211, such as tables. The dependencies 216 can include references, annotations, links, foreign keys, or other connections between the relational objects 214, which define the structure 212, at least in part. The records 204b include the data values of the relational data 211, and are generally stored in the relational objects 214 according to the structure 212.

The linear data 201 can be transformed into the relational data 211 as part of data access generation as described herein. The linear data structure 202 can be used, at least in part, to determine the relational data structure 212, including the relational objects 214 and the dependencies 216, as described herein. The linear data records 204a can be transferred or otherwise loaded into the relational data 211 as the relational data records 204b. Generally, the linear data records 204a and the relational data records 204b can have the same data values, but stored or arranged differently depending on their respective structures 202, 212.

The search model 221 can include one or more search definitions 222, one or more upper search definitions 224, and one or more search annotations 226. The search model 221 can be generated based on the relational data 211. Generally, the search definitions 222 can be based on the relational data structure 212, relational objects 214, and the dependencies 216. For example, each relational object 214 can have a corresponding search definition 222. The search definitions 222 can include dependencies, references, links, annotations, projections, or the like with other of the search definitions 222, which can be based on the relational data dependencies 216. A search definition 222 can include a query. For example, a search definition 222 can be generated as a query.

An upper search definition 224 can be generated based on one or more of the search definitions 222. Generally, the upper search definition 224 can aggregate one or more search definitions 222 to provide a primary search as an access point for the relational data 211. The upper search definition 224 can include an upper query. For example, the upper search definition 224 can be generated as an upper query.

The upper search definition 224 can include, or be associated with, one or more search annotations 226, which can provide information for executing, displaying, using, or otherwise accessing the upper search definition 224 and the relational data 211 via the search definitions 222 and the upper search definition. The search model 221 can provide enhanced access to the relational data 211 via the upper search definition 224 coupled with the search annotations 226.

The relational data 211 and the search model 221 for the relational data can form the access mode 210. The access mode 210 can be generated as described herein, which can provide or improve access to the linear data records 204a by presenting the data values therein through the relational data 211 as the relational records 204b, and presenting the search model 221 as an automatically generated or pre-generated method of access to the records 204b.

Figure 3A:
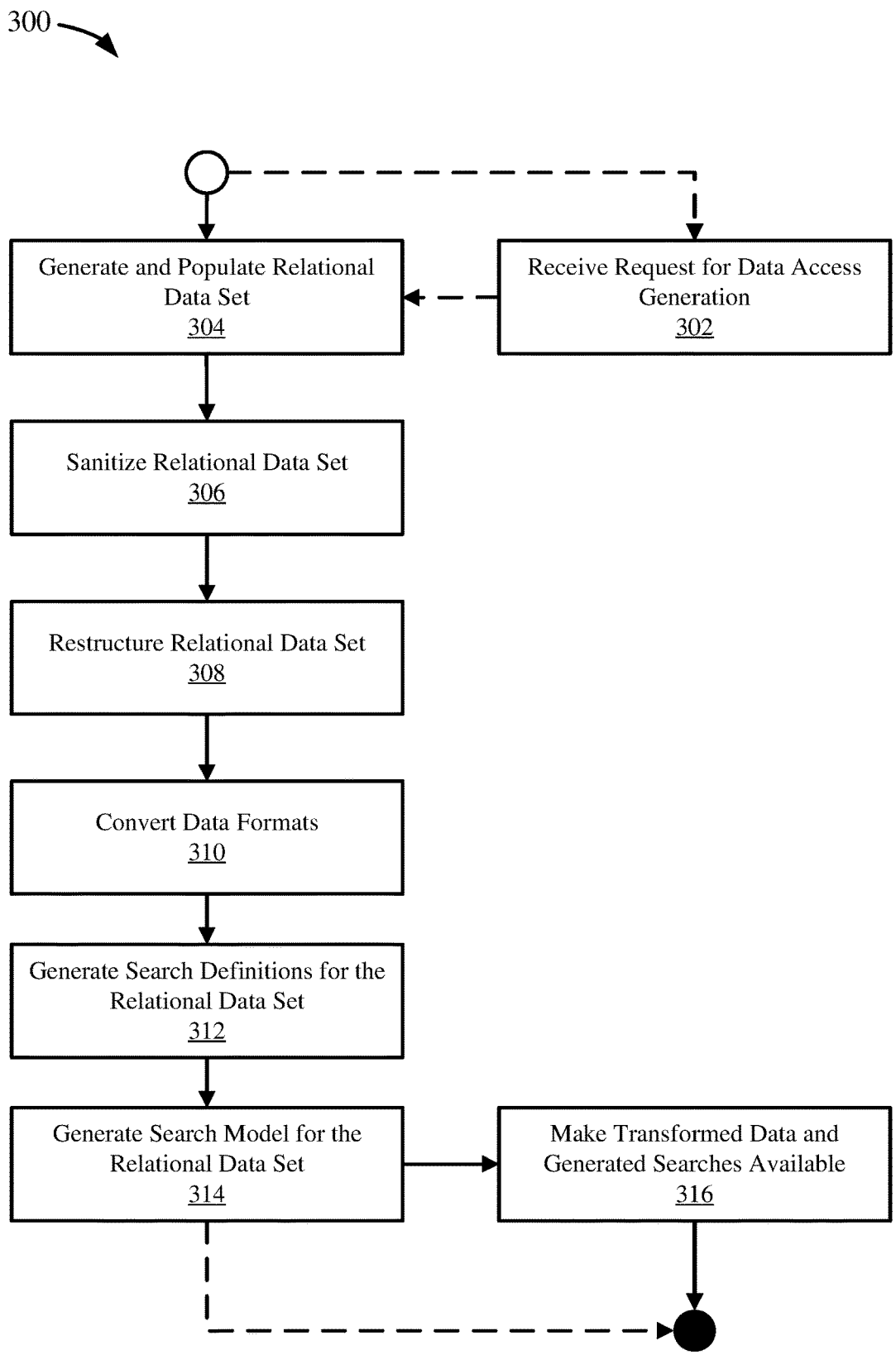
FIG. 3A is a flowchart of an example method of generating an access mode including relational data and a search model for a data set.

Example 4—Example Method that Transforms Data into Relational Data and Generates Search Models for the Relational Data FIG. 3A is a flowchart of an example method 300 of generating an access mode including relational data and a search model for a data set, and can be implemented, for example, by the system described in FIG. 1 and using data objects as described in FIG. 2.

At 302, a request for data access generation can be received. A data access generation request can include one or more variables or input arguments, such as described herein. For example, a data access generation request can include a linear data set or an identifier or location for a linear data set, transformation criteria, a target storage location for the generated data access, a mode of operation, or other settings for generating new data access, such as relational data and/or a search model, for a linear data set.

At 304, a relational data set can be generated and populated. Generally, the relational data set can be generated based on a linear data set, such as can be identified at 302 or identified based on a context for the process 300. Generating the relational data set can include determining a data structure or schema for the linear data set and generating a relational data structure or schema based on the determined linear data structure or schema. Further, the relational data structure or schema can be instantiated, such as in a database, and populated with the data values from the linear data. Generating and populating the relational data set at 304 can include, in whole or in part, the process 320, shown in FIG. 3B.

At 306, the relational data set can be sanitized or cleaned. Sanitizing or cleaning the relational data set can include analyzing the data values in the relational data set and correcting, improving, enhancing, or beautifying some or all of the values. For example, data values with incorrect data can have the incorrect data removed or corrected. Sanitizing the data can include comparing the data values in the relational data set to one or more sanitation criteria, as described herein.

In some embodiments, sanitizing the relational data set at 306 can be performed in conjunction with (e.g. as part of) populating the relational data set at 304. For example, data values can be sanitized as part of the population process at 304.

At 308, the relational data set can be restructured. Restructuring the relational data set at 308 can include altering the relational structure or schema, and then moving, arranging, or repopulating the data values based on the altered relational structure or schema. Restructuring the relational data set can include determining one or more functional dependencies between data fields in the relational data set, and generating new relational objects in the relational data schema based on the determined functional dependencies. The functional dependencies can be determined, in whole or in part, based on one or more dependency criteria. Further, the restructured relational data structure or schema can be instantiated, such as in a database, and repopulated with the data values. Restructuring the relational data set at 308 can include, in whole or in part, the process 340, shown in FIG. 3C.

At 310, the data values in the relational data set can be converted to a new format. Converting data in the relational data set can include changing the format of data values in one or more fields to a target data format. For example, date data values in one date format can be converted to date values in a different date format (e.g. MMDDYYYY to YYYYMMDD). Converting the data format can be based, in whole or in part, on one or more format criteria, as described herein. In some embodiments, additional fields or data can be added (or extraneous fields or data removed) based on the target data format.

At 312, one or more search definitions can be generated based on the relational data set. Generally, the search definitions generated can be used to access the data in the relational data set. For example, the search definitions can include SQL queries, stored procedures (e.g. in a DBMS), and/or views. The search definitions can be generated based on the relational structure or schema. For example, a search definition can be generated for each relational object (e.g. table) in the relational schema. Further, the search definitions can include references or invocations of other generated search definitions, based on the relational schema. In this way, search definitions can be created which provide access to the data values in the relational data set. Generally, the search definitions can cover all fields and relational objects in the relational schema, and can be linked or otherwise associated together based on the relational schema.

For example, a search definition can be generated for a relational object in the relational schema (e.g. table). For each field in the relational object (e.g. column of the table), the field can be added to a projection list for the object. For each relational dependency to another relational object in the current relational object (e.g. each foreign key in the table), an association can be added to the search definition linking both relational objects (e.g. a JOIN condition between two tables), and the association can be added to the projection list for the relational object.

At 314, a search model can be generated for the relational data set. Generating the search model at 314 can include generating an upper search definition based on the one or more search definitions generated at 312 and can further include generating or adding search annotations to the upper search definition.

Generating an upper search definition can include selecting a primary search definition from the search definitions generated at 312. The primary search definition can be the search definition that carries the main or primary set of data or information for the data set, which can be the focus of the relational data set. The primary search definition can be used as the basis for generating the upper search definition. The primary search definition can be automatically selected based on the number of associations between the search definitions (e.g. the primary search definition can be the search definition with the most associations to other search definitions) or can be selected by a user, or a combination thereof (e.g. an option is provided to a user). An example process for selecting the primary search definition is as follows:

For each search definition generated at 312, the following characteristic numbers can be calculated:
A=number of incoming search definition associations
B=number of outgoing search definition associations
C=B−A (difference between outgoing and incoming search definition associations)
D=number of fields
E=position of the name of the search definition, when all names are ordered alphabetically
Sort the search definitions according to the following 5 sort criterions:
ascending order with respect to A (in case of ambiguity, consider the next sort criterion)
descending order with respect to B (in case of ambiguity, consider the next sort criterion)
descending order with respect to C (in case of ambiguity, consider the next sort criterion)
descending order with respect to D (in case of ambiguity, consider the next sort criterion)
ascending order with respect to E (unambiguousness is guaranteed)
Based on this sorting, the search definition in position 1 can be selected as the primary search definition (e.g. primary basis CDS view).

The upper search definition can be generated based on the selected primary search definition. For example, the upper search definition can reference the primary search definition directly (e.g. in SQL, accessing the primary search definition with a FROM clause). The fields in the projection list of the primary search definition can be added to the projection list of the upper search definition. The outgoing associations in the primary search definition can be resolved and the resulting fields added to the upper search definition directly, which can further include their respective path information). Generally, the upper search definition can include all fields accessible by the primary search definition, whether directly or indirectly through association(s). An example process for resolving the associations is as follows (can be processed recursively, which can include tracking the depth of recursion to avoid paths of infinite or excessive length, and a default depth of 1 can be used if no depth is provided):
INPUT: a search definition association A
INPUT: current depth of recursion D (If no input is provided, D=1 is used as default)
an empty list of fields L
Assume, search definition V is the end point of the search definition association A
IF current depth of recursion D>3
THEN return the empty list of fields L and exit the current instance of the algorithm immediately
ELSE continue with the next statement
For each field F of the projection list of search definition V
Prefix the field name F with the path qualifier "A."
Add the (path-qualified) field A.F to the list of fields L
For each outgoing search definition association B of search definition V
Resolve search definition association B completely (Note: This is a recursive call of the algorithm with search definition association B as first input value and D+1 as current depth of recursion as second input value)
Assume, R is the list of (path-qualified) fields which results from resolving search definition association B
For each (path-qualified) field Q of list R
Prefix the path of the path-qualified field Q with "A."
Add the path-qualified field A.Q to the list of fields L
Return the list of fields L as output Generating or adding search annotations to the upper search definition can include adding search-related characteristics to the upper search definition. Search-related characteristics can include field-level characteristics, such as denoting response fields, request fields, facets, and the like. The annotations can be defined or added by a user, in whole or in part. For example, the search-related characteristics can be defined by a user, and the appropriate annotations added automatically. Generally, the search annotations can be added based on the search characteristics and any further characteristic details provided or determined.

In some embodiments, the complexity of the upper search definition can be reduced by removing unnecessary fields from the upper search definition. For example, a field without a search annotation or that is not referenced by a search annotation can be removed.

At 316, the transformed data and generated searches (e.g. access mode) can be provided or otherwise made available (e.g. to other systems or users). Providing the generated access mode (e.g. transformed data and/or generated searches) at 316 can include displaying the access modes in a user interface or other API (e.g. search definitions through a RESTful architecture). Additionally or alternatively, making available at 316 can include registering the relational data set and/or the search model (and/or search definitions) in a database or other data storage system, such that the data and/or searches are available for access. Additionally or alternatively, a report can be provided at 316 including the status or other information about the process 300.

The relational data set and the search definitions and search model can be stored at 316, such as in a database or data storage facility. Alternatively or additionally, the relational data set can be stored when it is generated at 304 (and again when it is updated through steps 306 to 310), the search definitions can be stored when they are generated at 312, and/or the search model can be stored when it is generated at 314.

The method 300 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 5—Example Method that Generates and Populates Relational Data

Figure 3B:
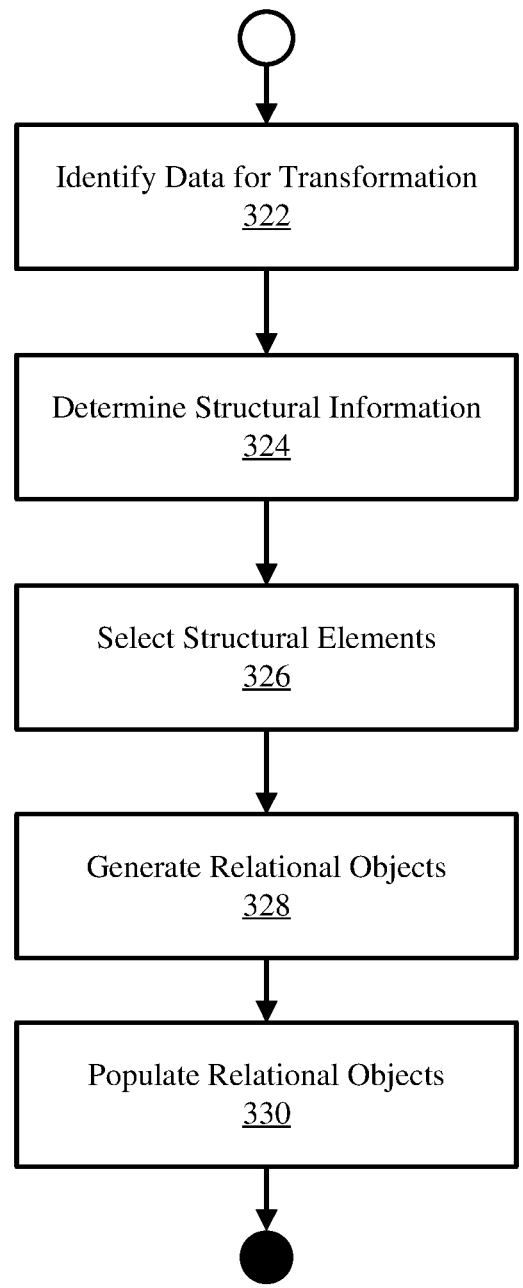
FIG. 3B is a flowchart of an example method of generating a relational data schema and relational data based on linear data and the linear data structure.

FIG. 3B is a flowchart of an example method 320 of generating a relational data schema and relational data based on linear data and the linear data structure, and can be implemented, for example, by the system described in FIG. 1 and using data objects as described in FIG. 2. The method 320 can be integrated, in whole or in part, with the method 300 shown in FIG. 3A, such as at step 304.

At 322, data for transformation can be identified. Identifying data for transformation at 322 can include identifying a linear data set, and one or more files or storage locations for the data set. For example, data files storing the target data for transformation can be retrieved, opened, or otherwise accessed to analyze and/or extract the data for transformation. Identifying the data at 322 can include identifying a structural definition or schema for the data, such as in an associated file or data system.

At 324, structural information for the target data (e.g. linear data) can be determined. In some cases, a structural definition or schema can be accessed and analyzed to determine the structural information of the target data. In other cases, a definition may not be available. In such cases, the target data can be analyzed (e.g. iteratively over the file or files, and/or over records in the linear data) to determine the structural information. The structural information can include identifying data elements, data fields, data types for the fields/elements, data attributes, cardinalities for the data fields/elements, a root data element, a data element hierarchy or relationship between data elements, and the like.

At 326, structural elements of the target data can be selected. Selecting structural elements at 326 can include identifying one or more elements from the target data (e.g. linear data) for transformation to relational data. In some embodiments, this can be accomplished automatically. In other embodiments, a user can be prompted to select particular elements.

For example, selection of structural elements can be done according to a configurable mode. Example modes are:
Mode 1 ("Select all except . . . "): as a default, all existing structural elements can be marked as "relevant" (e.g. selected). In some embodiments, a user can deselect unwanted structural elements.
Mode 2 ("Start with an empty selection"): as a default, no structural element is marked as "relevant" (e.g. selected). A user can select structural elements desired for transformation.
Mode 3 ("Heuristic"): the concrete/actual data values can be evaluated to determine the data quality of the structural elements, and selection of the elements can be based, in whole or in part, on this analysis. Example criteria for selection include: the proportion of empty values, the proportion of very short values, the number of different values present, the result of a check against a data value dictionary, and the like. Structural elements with a high data quality can be selected, such as elements that meet a data quality threshold. In some embodiments, the modes for structural element selection can be combined (e.g. heuristic plus user input).

At 328, relational objects can be generated based on the selected structural elements. Generating the relational objects at 328 can be based on the determined structural information for the selected structural elements. For example, a relational object (e.g. a table in a relational database) can be generated for a corresponding selected structural elements (or elements) from the target data. The relational objects generated can include foreign keys to other generated relational objects based on hierarchical or other structural information determined for the target data. Generating the relational objects at 328 can include generating a relational structure or schema, and instantiating the relational objects based on the relational schema.

In some cases, the target data can include a root structural element, for which a relational object can be created. The relational object corresponding to the root structural element can include a field (e.g. table column) for each attribute or other structural element of the root structural element, and, further, can include a field for each child structural element of the root structural element. In some cases, such child structural elements can have a cardinality with the root structural element of 0 . . . 1 or 1 . . . 1, and include a simple data type, and have been selected at step 326. For other child elements, separate relational objects (e.g. tables) can be created and linked via a foreign key).

At 330, the relational objects can be populated with data values from the target data. Generally, the data values from the target (linear) data can be extracted from the target data and inserted into the corresponding relational object and field within the relational object. Such populating of data can be performed iteratively and/or recursively across the target data set.

Figure 3C:
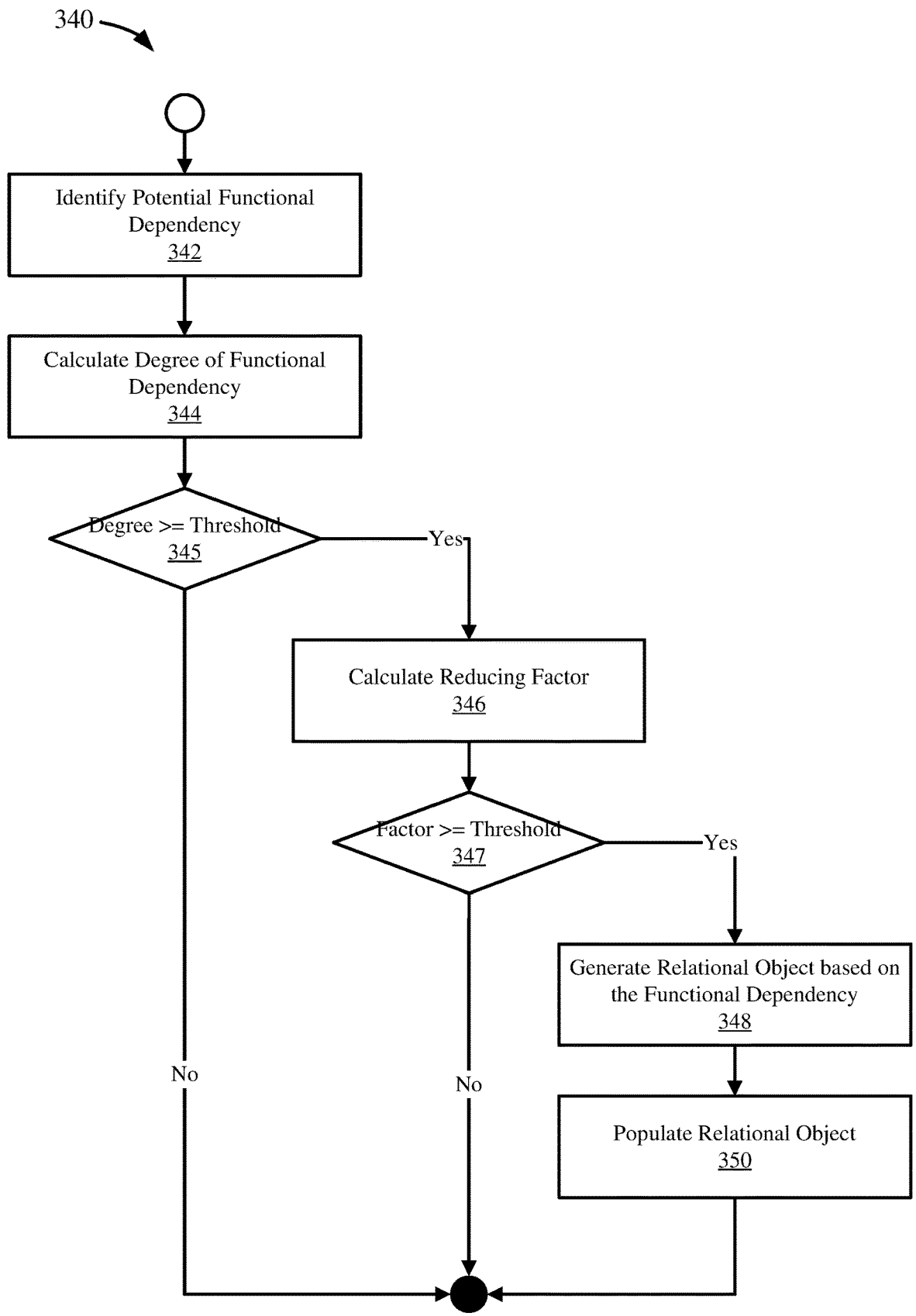
FIG. 3C is a flowchart of an example method of restructuring a relational data schema and its relational data based on analysis of the data values in the relational data.

Example 6—Example Method that Restructures, Combines, and Normalizes Relational Data FIG. 3C is a flowchart of an example method 340 of restructuring a relational data schema and its relational data based on analysis of the data values in the relational data, and can be implemented, for example, by the system described in FIG. 1 and using data objects as described in FIG. 2. The method 340 can be integrated, in whole or in part, with the method 300 shown in FIG. 3A, such as at step 308. Generally, the process 340 can reduce data redundancy in a data set by utilizing relationships identified in the relational data set to restructure the relational data schema and the instantiated relational data.

At 342, a potential functional dependency can be identified between two or more fields in the relational data. A functional dependency can exist between two or more fields in a data set when the value of one field implies the value of one or more other fields. For example, the value of a field "University" can imply the values of the field "University City" (e.g. the value "Columbia University" implies the value "New York" because Columbia University is always located in New York City). In this way, functional dependencies can indicate duplicative or redundant data, such as when functionally dependent data is repeated across records in a data set. Identifying a functional dependency at 342 can include analyzing the data fields in a relational object to determine if a value in a given field generally results in a same or consistent value in one or more other fields. In some embodiments, fuzzy logic can help identify same or similar values in a given field.

At 344, a degree of functional dependency can be calculated for the functional dependency identified at 342. The degree of functional dependency can be based, at least in part, on the number of records which match, or approximately match, the values between dependent fields. In this way, the degree of functional dependency can allow for consideration of weak or inexact functional dependencies, e.g. fields which may be functionally dependent, but not every record is an exact match between the dependent fields.

The degree of functional dependency can be calculated as a value between 0 and 1, where 0 indicates no functional dependency (e.g. 0% of the records indicate functional dependency between the fields) and 1 indicates full functional dependency (e.g. 100% of the records indicate functional dependency between the fields). The degree of functional dependency can be calculated between each pair of fields in a relational object (e.g. each pair of columns in a table). The degree of functional dependency can be calculated as the percentage of rows which indicate the functional dependency (e.g. have a match across the records).

If the degree of functional dependency meets or exceeds a threshold ("yes" at 345), the process 340 proceeds to restructure the relational data based on the identified functional dependency. If the degree of functional dependency does not meet or exceed the threshold ("no" at 345), then the potential functional dependency is discarded. The degree of functional dependency can be analyzed at 345 in one or more modes, such as:

Mode 1 ("Ignore Weak Functional Dependency"): only strict functional dependencies are used as basis for restructuring the relational data, where the degree of functional dependency is 1.0 (e.g. 100%). Weak functional dependencies can be ignored.

Mode 2 ("User-defined threshold for Functional Dependency"): a user-defined threshold for the degree of functional dependency can be used to identify functional dependencies. For example, if the calculated degree of functional dependency exceeds the threshold, the data is restructured based on the functional dependency. Otherwise, the data remains unchanged for this potential functional dependency.

Mode 3 ("Default threshold for Functional Dependency"): a threshold for the degree of functional dependency can be configured as a default threshold (e.g. 95%, or 0.95). If the calculated degree of functional dependency exceeds this threshold, the data is restructured based on the functional dependency. Otherwise, the data remains unchanged for this potential functional dependency.

At 346, a reducing factor for the functional dependency can be calculated. The reducing factor can be a factor of data redundancy reduction based on the number of fields reduced to a number of rows. For example, the reducing factor can be calculated as R=N/D, where R is the reducing factor, N is the number of rows, and D is the number of different values of the relevant column (e.g. the "University" field from the example above). Example calculations in SQL for the variables are:

N = SELECT COUNT(*) FROM myTable;
D = SELECT COUNT(DISTINCT relevantColumn) FROM myTable;

If the reducing factor meets or exceeds a threshold ("yes" at 347), the process 340 proceeds to restructure the relational data based on the identified functional dependency. If the reducing factor does not meet or exceed the threshold ("no" at 347), then the potential functional dependency is discarded. The reducing factor can be analyzed at 347 in one or more modes, such as:

Mode 1 ("User-defined threshold for the reducing factor"): a user-defined threshold for the reducing factor can be compared to the calculated reducing factor. If the actual data reduction would meet or exceed this threshold, the relational data can be restructured. Otherwise, the relational data remains unchanged for this potential functional dependency.

Mode 2 ("Default threshold for the reducing factor"): a default threshold for the reducing factor (e.g. 3) can be compared to the reducing factor. If the actual data reduction would meet or exceed this threshold, the data is restructured. Otherwise, the data remains unchanged for this potential functional dependency.

Mode 3 ("Start with an empty selection"): as a default, no part of the relational data is pre-selected or identified for restructuring/normalizing. A user can select the desired fields of the relational data for restructuring.

Mode 4 ("Start with a pre-selection and adjust"): based on a (user-defined or default) threshold for the reducing factor, the potential functional dependency fields can be presented to a user for restructuring. The user can broaden or restrict this proposed pre-selection of fields for restructuring.

At 348, a relational object (e.g. table) can be generated based on the identified functional dependency. The relational object can include the fields (e.g. columns) that are functionally dependent between each other.

At 350, the generated relational object can be populated based on the data in the functionally dependent fields. Generally, populating the data decreases redundancy by creating a single entry or record in the generated relational object for the same values of the functionally dependent fields. Additionally, populating the relational object can include deleting or removing the functionally dependent fields from their original relational object (except for the target field, which identifies the data).

Generally, the process 340 can be repeated iteratively to identify all functional dependencies (meeting the dependency criteria) in a relational data set.

Figure 4A:
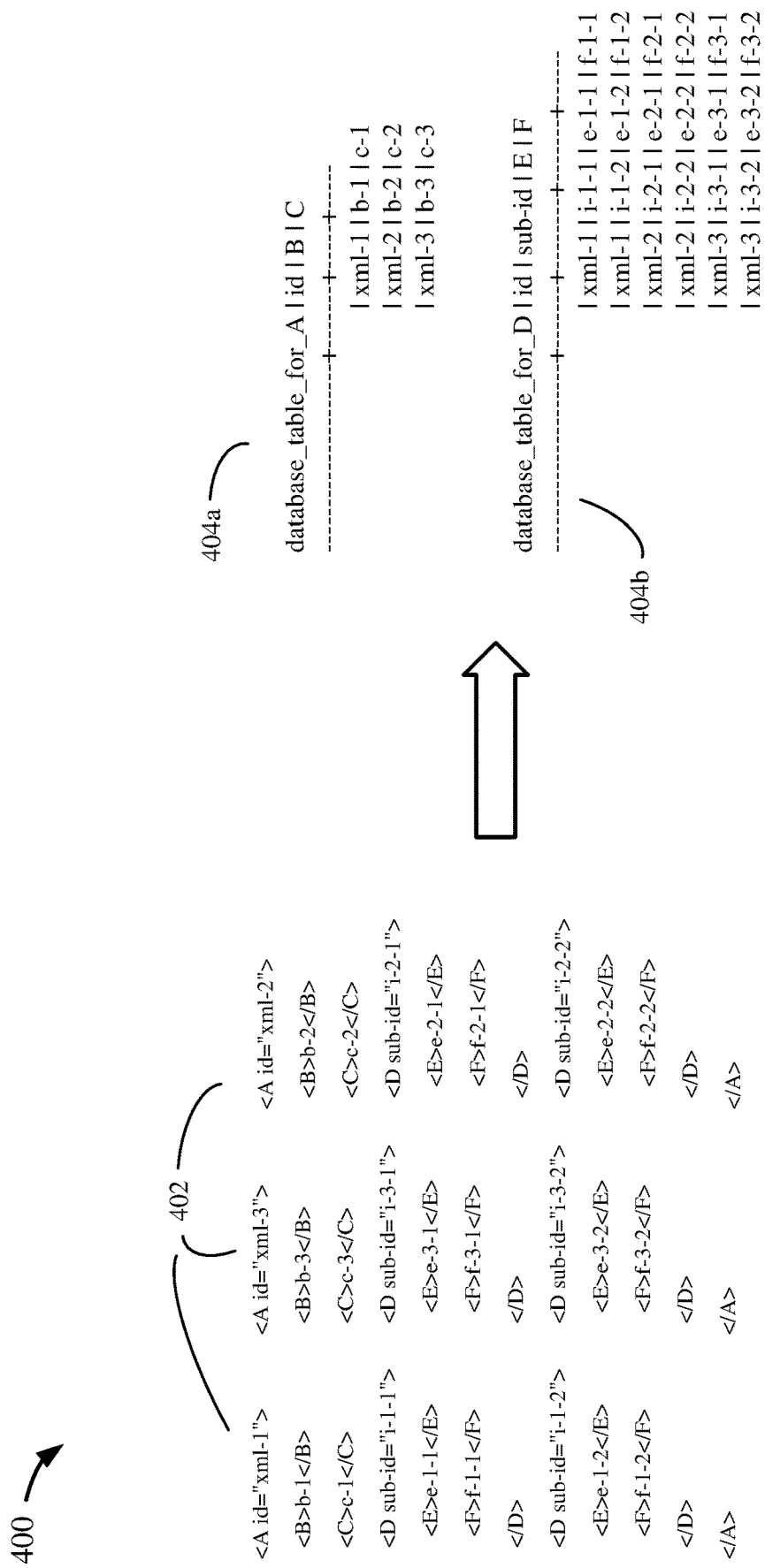
FIG. 4A is an example illustrating transformation of linear data into relational data.

Example 7—Example XML to Database Table Transformation, Table Restructuring, Search View Generation, and Search Model Generation FIG. 4A is an example 400 illustrating transformation of linear data into relational data. The example 400 illustrates, in part, process 300 shown in FIG. 3A and process 320 shown in FIG. 3B. Linear data can include XML data 402, which can be found in separate XML files or within the same file or other data source. The XML data 402 can be transformed, as described herein, into the relational data, which can include database tables 404a and 404b. The transformation of XML data 402 to database tables 404a-b can be based, at least in part, on structural information for the XML data. Example structural information for the XML data 402 is as follows:

XML Element A: root/complex data type/cardinality not applicable/Attributes: id

XML Element B: child of A/simple data type String/cardinality 1 . . . 1/no Attributes XML Element C: child of A/simple data type String/cardinality 1 . . . 1/no Attributes XML Element D: child of A/complex data type/cardinality 1 . . . n/Attributes: sub-id XML Element E: child of D/data type String/cardinality 1 . . . 1/no Attributes XML Element F: child of D/data type String/cardinality 1 . . . 1/no Attributes Thus, based on the structural information, for XML Element "A", a database table with the columns "id", "B" and "C" is created, and for XML Element "D", a database table with the columns "id", "sub-id", "E" and "F" is created. The column "id" is used to realize the foreign key relationship between the tables.

Figure 4B:
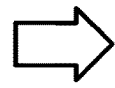
FIG. 4B is an example illustrating restructuring a relational object in relational data.

FIG. 4B is an example 410 illustrating restructuring a relational object in relational data. Database table 412 is an example table generated from linear data before restructuring. Several of the fields store redundant information in each record, specifically, the university fields u_city, u_zip, u_state, and u_phone. These fields are functionally dependent on the field "university" because their value consistently depends on the value in "university." Thus, based on the functional dependency between the field "university" and the other university fields, a separate database table can be generated to store those fields. Accordingly, the database table 412 can be restructured into database table 414a, which stores the student information, and database table 414b, which stores the university information. The "university" field remains in the student table 414a as it is both relevant to the student and acts as a foreign key for the university table 414b. The other university fields are removed from the student table 414a.

In some cases, the actual data values may be inconsistent due to data errors, such as data entry typos. For example, the original student table 412 may have the following data:

```
student | name  | DoB  | university | u_city   | u_zip | u_state    | u_phone
--------+-------+------+------------+----------+-------+------------+-------------
        | Aaron | 1980 | Uni of Cal | Berkeley | 94720 | California | 555-642-5215
        | Beca  | 1985 | Uni of Cal | Berkeley | 94721 | California | 555-642-5215
        | Cami  | 1982 | Uni of Cal | Berkeley | 94720 | California | 555-642-5275
        | Daisy | 1984 | Uni of Cal | Berkeley | 94720 | Cal        | 555-642-5215
        | Eddi  | 1980 | Columbia U | New York | 10827 | New York   | 555-854-4900
        | Faith | 1995 | Columbia U | New York | 10027 | New York   | 555-854-4900
        | Garry | 1981 | Uni of Cal | Berkeley | 94720 | California | 555-642-5215
        | Halea | 1980 | Columbia U | New York | 10027 | New York   | 555-864-4900
        | Ira   | 1980 | Columbia U | New York | 10027 | NY         | 555-854-4900
        | Jacky | 1989 | Uni of Cal | Berkeley | 94720 | California | 555-642-5215
```

The highlighted fields are examples of specific erroneous data values. The functional dependency still is present, however, identifying the functional dependency can be difficult with imprecise data as shown. Calculating the degree of functional dependency, as described herein, can alleviate this issue in some cases, by allowing restructuring to consider weak functional dependencies (e.g. dependencies that are not exactly consist across all data in all records, but are likely to still be an actual dependency).

Figure 4C:
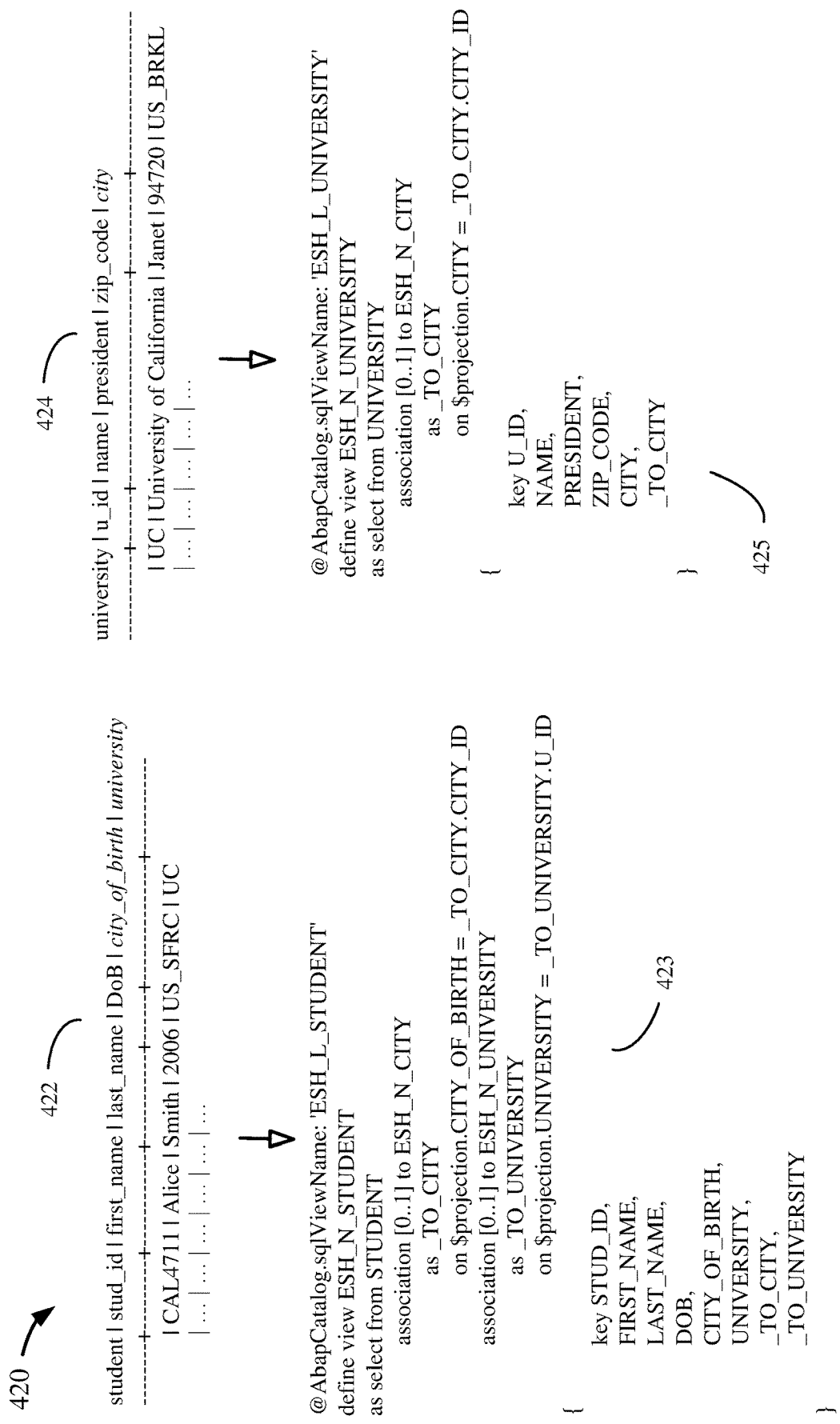
FIGS. 4C-D are an example illustrating search definitions generated for relational data objects.
Figure 4D:
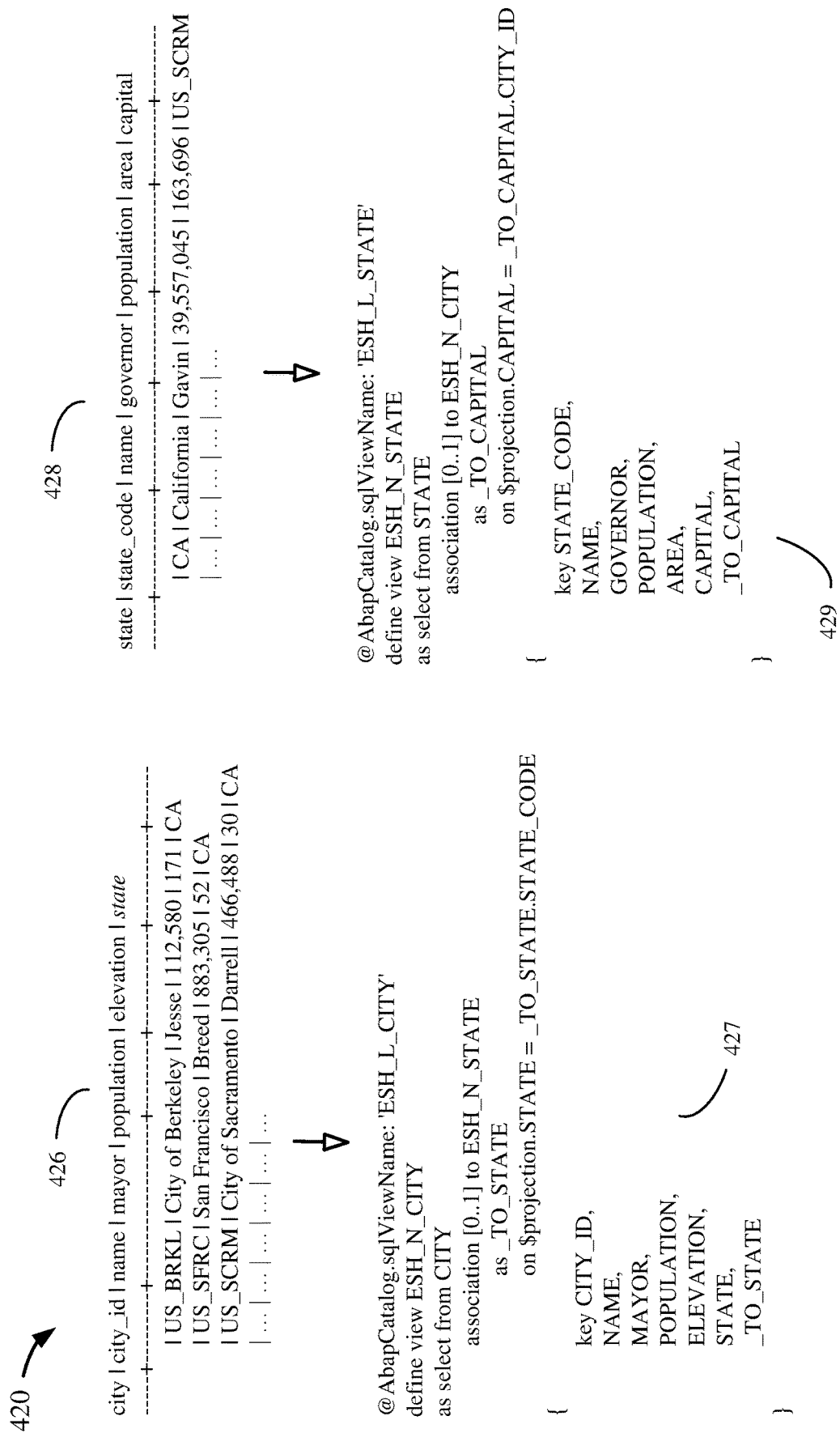

FIGS. 4C-D are an example 420 illustrating search definitions generated for relational data objects. Database tables 422, 424, 426, 428 each have a respective search view 423, 425, 427, 429 generated which can provide access to their records and to referenced records (e.g. foreign keys). Generally, the search views 423, 425, 427, 429 are based on the complete structure or set of fields in its associated database 422, 424, 426, 428 as the search view is intended, in some cases, to provide complete access to its database table.

FIG. 4E continues the example 420, illustrating an upper search definition 430, based on the database tables and search views shown in FIGS. 4C-D. The upper search definition 430 is a search view based on the search view 423 associated with the student table 422 as the primary search definition. As described herein, characteristics of the search views 423, 425, 427, 429 were calculated as follows (A=incoming associations, B=outgoing association, C=B−A, D=number of fields, E=position of the search definition when ordered):

| Search View    | A | B | C  | D | E |
|----------------|---|---|----|---|---|
| Student 423    | 0 | 2 | 2  | 6 | 3 |
| University 425 | 1 | 1 | 0  | 5 | 4 |
| City 427       | 3 | 1 | −2 | 6 | 1 |
| State 429      | 1 | 1 | 0  | 6 | 2 |

Once sorted, as described herein, the student search view 423 is the top view, thus it is selected as the primary view for use in generating the upper search view 430.

FIG. 4F is a continuation of example 420, illustrating an annotated upper search definition 432, based on the upper search view 430 shown in FIG. 4E. For this example, the following annotations for the upper search view 430 can be determined:

Use "Students" as name of the Search Connector.
Use the student's first name as title and the student ID as subtitle.
Use the student's first name and the student's last name as Auto Completion Request Fields.
Use the student's first name, the student's last name and the name of the university as Freestyle Search Request Fields with HIGH relevance.
Use the place of birth, the state of birth and the city of the university as Freestyle Search Request Fields with MEDIUM relevance.
Use the birthplace's mayor, the governor of the state of birth and the governor responsible for the university as Freestyle Search Request Fields with LOW relevance.
Use the university (display position 1), the place of birth (display position 2), the state of birth (display position 3) and the date of birth (display position 4) as Facetted Search Request Fields.
Use the student ID (display position 1) as Advanced Search Request Field.
Use the following 12 Ordinary Response Fields: first name (display position 1), last name (display position 2), date of birth (display position 3), place of birth (display position 4), university (display position 5), city of university (display position 6), president of university (display position 7), state of birth (display position 8), capital of state of birth (display position 9), governor of state of birth (display position 10), birthplace's mayor (display position 11) and governor responsible for university (display position 12)
Use the following field descriptions: "Student ID", "First Name", "Last Name", "Date of Birth", "Place of Birth", "Birthplace's Mayor", "State of Birth", "Governor of State of Birth", "Capital of State of Birth", "University", "President of University", "City of University" and "Governor responsible for University."

Based on these determined annotations, the upper search view 430 can be updated to include the annotations (e.g. execution information) as shown in the annotated search view 432.

Example 8—Example Access Mode, Linear Data, and Relational Data

In any of the examples herein, an access mode can include a data structure or schema for storing a data set and/or a search definition, set of search definitions, or a search model for accessing data in the data set. An access mode can provide a means, in some cases through one or more tools, of retrieving data from a data set. For example, an access mode can provide a known structure of the data, making the data available for retrieval based on that structure (e.g. through queries based on the structure), or through pre-defined search definitions which can be executed or otherwise triggered for retrieving the data in the data set.

In any of the examples herein, linear data can include data organized, structured, and stored in XML, JSON, or other markup language or tree-structured data, a flatfile database or other non-relational data schema. Generally, linear data can include data sets which duplicate data across records, rather than include references between records.

Linear data can include data stored as attribute-value pairs, where an attribute and its value are stored sequentially together, or adjacent to each other. For example, an attribute-value pair can include a field name and a field value, stored together. Generally, attribute-value pairs are stored per occurrence of a value for that attribute, thus an attribute can be repeated multiple times in a data set based on multiple value occurrences. For example, an attribute can be a field name, such as STUDENT, and an attribute-value pair can be STUDENT:Aaron or STUDENT:Beca (where "Aaron" and "Beca" are values of the attribute STUDENT). If both values "Aaron" and "Beca" are present in a data set, then their associated attribute (e.g. field) STUDENT can be stored repeatedly for each value, such as "STUDENT:Aaron,STUDENT:Beca".

In any of the examples herein, relational data can include data organized, structured, and stored based on a relational structure or schema (e.g. using the relational model), such as in a relational data base. Generally, the relational data can include data sets which include references between relational objects, which generally reduces data duplication.

Example 9—Example Search Definitions, Search Definition Sets, and Search Models In any of the examples herein, a search definition can include interpretable text, code, or pseudo-code detailing a search for data against a data source. A search definition can be executable by a data source, or data management system. A search definition can be, for example, a search string, query, search object or data structure, stored procedure, database view or materialized view, or the like. For example, a search definition can be an SQL query or a CDS-based search view (Core Data Services™ technology from SAP SE of Walldorf, Germany).

In any of the examples herein, a search definition set can be a collection of one or more search definitions. In some cases, a search definition set can represent a search model, which can express how to search or otherwise obtain one or more given classes or groupings of data. A search definition set can also be referred to as a stack, or search stack.

In any of the examples herein, an element of a search definition can include an operation, field, or other programmatic statement, or portion or clause of an operation or statement, in the search definition. In some cases or embodiments, an element can be defined, at least in part, by the line or lines of code in which the element is found.

In any of the examples herein, a search model can be a search definition or a search definition set with corresponding search annotations for one or more of the search definitions.

Example 10—Example Search Annotations and Search Characteristics

In any of the examples herein, a search annotation can include information regarding one or more fields in a search definition, which can indicate how to use the field in executing the search definition. A search annotation can be based on one or more search characteristics. Example search characteristics can include:
Freestyle Search Request Fields
   for enabling a "Google-like" search for a quick and easy search experience
Facetted Search Request Fields
   for enabling a targeted restriction of the current result set based on value distribution of fields
Advanced Search Request Fields
   for enabling a fine-granular search with detailed search criteria for experienced domain experts
Auto Completion Request Fields
   Enterprise Search predicts the rest of the search term a user is typing Title Response Fields
  Which fields are relevant to the title of a search hit?
Title-with-Subtitle Response Fields
  Which fields should be used to build the title/subtitle pair?
Ordinary (Non-Title) Response Fields
  Which fields should be part of the search result?
Long Text Response Fields
  In the search result, a snippet of the field value will be rendered across multiple columns
Photo-of-a-Person Thumbnail Response Fields
  The field value is a URL that points to an image file—showing a person
Ordinary (Non-Person) Thumbnail Response Fields
  The field value is a URL that points to an image file (not showing a person)
Fields representing Quantity and Unit Of Measurement
  One field contains a quantity (e.g. 5). The other field contains the unit of measurement (e.g. kg). In the result list, both parts should be rendered jointly as 5 kg.
Fields representing Amount and Currency Code
  One field contains an amount (e.g. 7). The other field contains the currency code (e.g. USD). In the result list, both parts should be rendered jointly as 7 USD.
Fields representing Code/ID and its Text
  One field contains a code (e.g. CA). The other field contains the description (e.g. California). In the result list, both parts should be rendered jointly as CA California.
Parts of General Field Groups
  Example: One field contains the academical degree (e.g. Dr.). The second field contains the first name (e.g. Daisy). The third field contains the middle initial (e.g. W). The fourth field contains the last name (e.g. Smith). In the result list, all parts should be rendered jointly as Dr. Daisy W Smith.
Fields for enabling Direct (URL-based) Navigation
  The field contains a URL. In the search result, the URL should be clickable.
Fields representing Clickable E-Mail Addresses
  The field contains an e-mail address. In the search result, the e-mail address should be clickable. Clicking on the e-mail address opens an e-mail application (e.g. Microsoft Outlook).
Fields representing Clickable Telephone Numbers
  The field contains a telephone number. In the search result, the telephone number should be clickable. Clicking on the telephone number opens a telephone application (e.g. Skype for Business).

Further details or information for search annotation characteristics, such as the examples above, can include the following examples:
  For each Freestyle Search Request Field, the user/system can choose a relevance.
    possible relevance values: HIGH, MEDIUM and LOW
    With this selection, the user/system specifies how relevant a (Freestyle Search) hit on the respective field is for ranking. (In the result set, the hits are sorted according to their rank values. The best-ranked search hit is displayed at first position.)
  For each Facetted Search Request Field, the user/system can choose a display position
    for example, the user has to specify the sequence/order of the Facetted Search Request Fields.
    In the Facetted Search dialog of the Search UI, the Facetted Search Request Fields are displayed in the order specified.
  For each Advanced Search Request Field, the user/system can choose a display position
    for example, the user/system can specify the sequence/order of the Advanced Search Request Fields.
    In the Advanced Search dialog of the Search UI, the Advanced Search Request Fields are displayed in the order specified.
  For each Ordinary Response Field, the user/system can choose a display position
    For example, the user/system can specify the sequence/order of the Ordinary Response Fields.
    In the result list of the Search UI, the Ordinary Response Fields are displayed in the order specified.
  For each Freestyle Search Request Field, for each Facetted Search Request Field, for each Advanced Search Request Field and for each Response Field, the user/system can specify a meaningful field description.
    For Freestyle Search Request Fields, the field description is displayed as part of the Why Found information.
    For Facetted Search Request Fields, the field description is displayed in the Facetted Search dialog of the Search UI.
    For Advanced Search Request Fields, the field description is displayed in the Advanced Search dialog of the Search UI.
    For Response Fields, the field description is displayed as part of the query result.
  The user/system can specify the name of the Search Connector.
    The name of the Search Connector is shown in the drop-down menu of the Search UI.

As examples, based on the search characteristics and search characteristic details, search annotations can be added as follows:
  Add the search annotation @Search.searchable: true on view level (in order to signal, that the search definition is relevant to search scenarios).
  Add the search annotation @EnterpriseSearch.enabled: true on view level (in order to signal, that the search definition is relevant to Enterprise Search).
  Assume, that K1, K2 and K3 are the key fields of the underlying the primary search definition. Add the search annotation @ObjectModel.semanticKey: ['K1', 'K2', 'K3' ] on view level (in order to specify the required Enterprise Search Semantic Key). For example, the mentioned search annotation is added to the upper search definition—and not to the primary search definition. This can apply to all search-specific search annotations.
  Assume, that SCN is the user-specified name of the Search Connector. Add the search annotation @UI.headerInfo.typeNamePlural: 'SCN' on view level.
  For each Freestyle Search Request Field:
    Add the search annotation @Search.defaultSearchElement: true to the corresponding search field.
    Dependent on the chosen relevance, add the search annotation @Search.ranking: #HIGH, @Search.ranking: #MEDIUM or @Search.ranking: #LOW to the corresponding search field.
  For each Facetted Search Request Field:
    Assume, that dp is the display position of the Facetted Search Request Field.

Add the search annotation @EnterpriseSearch.filteringFacet: {default, displayPosition: dp} to the corresponding search field.

For each Advanced Search Request Field:
Assume, that dp is the display position of the Advanced Search Request Field.
Add the search annotation @EnterpriseSearch.filteringAttribute: {default, displayPosition: dp} to the corresponding view field.

For each Auto Completion Request Field:
Add the search annotations @Search.defaultSearchElement: true and @EnterpriseSearch.defaultValueSuggestElement: true to the corresponding view field.

For the Title Response Field:
Assume, that TRF is the name of the Title Response Field.
Add the search annotation @UI.headerInfo.title: {value: 'TRF'} on view level.

For the Title-with-Subtitle Response Fields:
Assume, that TPF is the name of the field which represents the title part.
Assume, that SPF is the name of the field which represents the subtitle part.
Add the search annotation @UI.headerInfo: {title: {value: 'TPF'}, description: {value: 'SPF'} } on search level.

For each Ordinary (Non-Title) Response Field:
Assume, that dp is the display position of the Response Field.
Add the search annotation @UI.identification: {position: dp} to the corresponding search field.

For each Long Text Response Field:
Add the search annotations @UI.identification: {position: 0}@UI.multiLineText and @EnterpriseSearch.snippets: {enabled, maximumLength: 250} to the corresponding search field.

For each Photo-of-a-Person Thumbnail Response Field:
Add the search annotations @UI.identification: {position: 0} and @Semantics.contact.photo to the corresponding search field.

For each Ordinary (Non-Person) Thumbnail Response Field:
Add the search annotations @UI.identification: {position: 0} and @Semantics.imageUrl to the corresponding search field.

For each pair of fields representing Quantity and Unit Of Measurement:
Assume, that UOMF is the name of the field which represents the Unit Of Measurement.
Add the search annotation @Semantics.quantity.unitOfMeasure: 'UOMF' to the search field which represents the Quantity.
Add the search annotation @Semantics.unitOfMeasure to the view field UOMF which represents the Unit Of Measurement.

For each pair of fields representing Amount and Currency Code:
Assume, that CCF is the name of the field which represents the Currency Code.
Add the search annotation @Semantics.amount.currencyCode: 'CCF' to the search field which represents the Amount.
Add the search annotation @Semantics.currencyCode to the view field CCF which represents the Currency Code.

For each pair of fields representing Code/ID and its Text:
Assume, that TF is the name of the field which represents the Text.
Add the search annotation @ObjectModel.text.element: 'TF' to the search field which represents the Code/ID.
Add the search annotation @UI.hidden to the search field TF which represents the Text.

For each group of fields building a General Field Group:
Assume, that GFGID is the ID of the General Field Group.
Assume, that GFGN is the name/label of the General Field Group.
Add the search annotation @UI.connectedFields: {qualifier: 'GFGID', groupLabel: 'GFGN' } to all fields that are part of the General Field Group.

For each field which enables Direct (URL-based) Navigation:
Add the search annotation @Semantics.url to the corresponding search field.

For each field which enables a Clickable E-Mail Address:
Add the search annotation @Semantics.eMail.address to the corresponding search field.

For each field which enables a Clickable Telephone Number:
Add the search annotation @Semantics.telephone to the corresponding search field.

For each field with a user-specified field description:
Assume, that FD is the user-specified field description of the field.
Add the search annotation @EndUserText.label: 'FD' to the corresponding search field.

Example 11—Example Sanitation Criteria

In any of the examples herein, sanitation criteria can include values, rules, subroutines, or other logic for removing or altering incorrect or malformed data values in a data set (e.g. a relational data set). For example, sanitation criteria can be used to: remove excess whitespace, detect invalid email addresses, detect empty string values, detect strange or atypical personal names, remove excess or unwanted quotation marks, detect invalid field values for fields with a specific value set (e.g. country names), detect special values, or other data correction processes. Such criteria checks can be methods, functions, or other subroutines, which can be called or triggered to perform their particular data sanitation function, and can optionally be active or inactive based on user configuration or selection.

For whitespace removal, consecutive whitespace characters can be replaced by a single blank. Such whitespace removal can be accomplished by an SQL statement, for example, such as:

```
UPDATE myTable
SET myColumn = REPLACE_REGEXPR('\s\s+' IN myColumn WITH ' '
OCCURRENCE ALL)
WHERE myColumn LIKE_REGEXPR '\s\s';
```

Whitespace removal can include several possible modes of operation, for example:
Mode 1 ("Update all table columns beside . . . "): as default, existing textual table columns are updated, but the user can deselect one or more table columns explicitly. Consecutive whitespace characters in the deselected table columns can then be preserved.

Mode 2 ("Start with an empty selection"): as default, no table column is updated, but the user can select relevant textual table columns to update.

Mode 3 ("Heuristic"): based on the actual data values, the whitespace-related data quality of each textual table column can be evaluated against various criteria, such as the number of rows with consecutive whitespace characters or the proportion of whitespace characters. Table columns with a poor whitespace-related data quality (e.g. too many whitespaces compared to a threshold) can be automatically selected for an update. A user can set a threshold for the data quality or a default threshold can be used. In some embodiments, a heuristic-based list of proposed changes can be provided to the user for selection/removal.

For valid/invalid email address detection, email address values can be checked against email address criteria. Invalid email addresses can be provided to a user for confirmation (e.g. ignore, correct, or delete). Such invalid email address detection can be accomplished by an SQL statement, for example, such as:

```
SELECT * FROM myTable
WHERE myColumn NOT LIKE_REGEXPR
'^[a-zA-Z][a-zA-Z0-9\.\-\_]*\@[a-zA-Z0-
9]+[a-zA-Z0-9\.\-\_]*\.[a-zA-Z0-9\.\-\_]+$';
```

For empty string detection, string-type values can be checked against emptiness criteria (e.g definition for empty). Empty string fields can be provided to a user for confirmation (e.g. ignore, correct, or delete). Such empty string detection can be accomplished by an SQL statement, for example, such as:

```
SELECT * FROM myTable
WHERE myStringColumn1 IN ('', ' ') OR
myStringColumn2 IN ('', ' ') OR
myStringColumn3 IN ('', ' ');
```

For atypical name detection, string-type values can be checked against name pattern criteria. Atypical name fields can be provided to a user for confirmation (e.g. ignore, correct, or delete). Such atypical name detection can be accomplished by an SQL statement, for example, such as:

```
SELECT * FROM myTable
WHERE LENGTH(FirstName) <= 1 OR
FirstName LIKE_REGEXPR '^([a-zA-Z]\s?\.\s?)+$' OR
FirstName LIKE_REGEXPR '^[a-zA-Z](\s+[a-zA-Z])+$' OR
LENGTH(LastName) <= 1 OR
LastName LIKE_REGEXPR '^([a-zA-Z]\s?\.\s?)+$' OR
LastName LIKE_REGEXPR '^[a-zA-Z](\s+[a-zA-Z])+$';
```

For excess quotation mark removal, string values can be analyzed to identify incorrect or excess quotation marks, which can then be removed. For example, a string value can include all-embracing quotation marks (e.g. "this is the data string"), which can be removed as they are generally unnecessary (e.g. this is the data string). Such quotation mark-removal can be accomplished by an SQL statement, for example, such as:

```
UPDATE myTable
SET myColumn = REPLACE_REGEXPR('(^"\s*)|(\s*"\.*$)'
IN myColumn
WITH ' ' OCCURRENCE ALL)
WHERE myColumn LIKE_REGEXPR '^"[^"]*"\.*$';
```

For invalid field value detection, set-limited data values can be checked against their set of possible values. For example, a country field can be checked against the set of country names. Invalid field value fields can be provided to a user for confirmation (e.g. ignore, correct, or delete). Such invalid field value detection can be accomplished by an SQL statement, for example, such as (for a country name field):

```
SELECT * FROM myTable
WHERE CountryName NOT IN (SELECT validCountryNames
FROM myCountryDictionaryTable);
```

For special value detection, specific data values can be identified in target fields. For example, field values such as "DO NOT USE," "TEST," or "TO DO" can be identified in analyzed fields, and can be provided to a user for confirmation (e.g. ignore, correct, or delete). Such special value detection can be accomplished by an SQL statement, for example, such as (for a defined set of special values):

```
SELECT * FROM myTable
WHERE UPPER(myColumn) IN ('DO NOT USE', 'TEST', 'TODO',
'OBSOLETE');
```

Sanitation criteria can generally be available in a database or other data repository, data file, registry, or data structures or objects accessible by a data access generator. In some cases, sanitation criteria can be directly implemented in a data access generator, as described herein, or can be passed to a data access generator as part of an access generation request.

Example 12—Example Dependency Criteria

In any of the examples herein, dependency criteria can include values, rules, or logic for identifying functional dependencies, as described herein. For example, dependency criteria can include one or more modes of operation for identifying and using functional dependencies, one or more thresholds for a degree of functional dependency, and/or one or more thresholds for a reducing factor for functional dependency.

Dependency criteria can generally be available in a database or other data repository, data file, registry, or data structures or objects accessible by a data access generator. In some cases, dependency criteria can be directly implemented in a data access generator, as described herein, or can be passed to a data access generator as part of a data access generation request.

Example 13—Example Format Criteria

In any of the examples herein, format criteria can include values, rules, or logic for converting data values (e.g. in the relational data) into a target format from their current format. For example, the target data format can be a data format primarily used by the database or data storage facility housing the relational data (e.g. the transformed data). Particular types of fields can be formatted or stored in particular ways, based on their format. For example, TIMESTAMP or DATE fields can be formatted based on the target format (e.g. changed from their current format to match the target format), NULL values can be changed to match the target format, and the like. Additionally or alternatively, converting to the target format can also include adding additional fields (e.g. columns in a table) based on the target format, merging fields or splitting fields based on the target format, or the like.

As an example, data values can be converted to the ABAP data format. Converting to ABAP can include adding a client-column MANDT, if this field is missing in the current relational data. Adding the MANDT data field can be accomplished by an SQL statement, for example, such as (for a client '002'):

```
INSERT INTO my_ABAP_table (MANDT, C1, C2, C3, C4, C5, C6, C7)
SELECT '002', C1, C2, C3, C4, C5, C6, C7
FROM my_original_table;
```

Further the example, converting to ABAP can include converting date data values to the ABAP date format DATS. Converting date data values to DATS can be accomplished by an SQL statement, for example, such as (for a client '002'):

```
INSERT INTO my_ABAP_table (MANDT, DateColumn1, DateColumn2)
SELECT '002',
TO_NVARCHAR(DateColumn1, 'YYYYMMDD'),
TO_NVARCHAR(DateColumn2, 'YYYYMMDD')
FROM my_original_table;
```

Further the example, converting to ABAP can include converting time data values to the ABAP time format TIMESTAMPL. Converting time data values to TIMESTAMPL can be accomplished by an SQL statement, for example, such as (for a client '002'):

```
INSERT INTO my_ABAP_table (MANDT, TimeStampColumn)
SELECT '002',
TO_DECIMAL(REPLACE_REGEXPR('[\.:\s\-]'
IN TO_NVARCHAR(TimeStampColumn)
WITH ''))/10000000
FROM my_original_table;
```

Further the example, converting to ABAP can include converting NULL data values to the ABAP type-specific initial values. Converting NULL data values to type-specific initial values can be accomplished by an SQL statement, for example, such as (for several different field types):

```
IF ABAP data type is 'INT4' THEN represent each NULL value as 0
IF ABAP data type is 'INT8' THEN represent each NULL value as 0
IF ABAP data type is 'DEC' THEN represent each NULL value as 0
IF ABAP data type is 'SSTRING' THEN represent each NULL value as '' (empty string)
IF ABAP data type is 'STRING' THEN represent each NULL value as '' (empty string)
IF ABAP data type is 'DATS' THEN represent each NULL value as '00000000'
```

-continued

```
IF ABAP data type is 'TIMS' THEN represent each NULL value as '000000'
IF ABAP data type is 'NUMC[7]' THEN represent each NULL value as '0000000'
```

Format criteria can generally be available in a database or other data repository, data file, registry, or data structures or objects accessible by a data access generator. In some cases, format criteria can be directly implemented in a data access generator, as described herein, or can be passed to a data access generator as part of an access generation request.

Example 14—Data Access Generation Module Environments

Figure 5A:
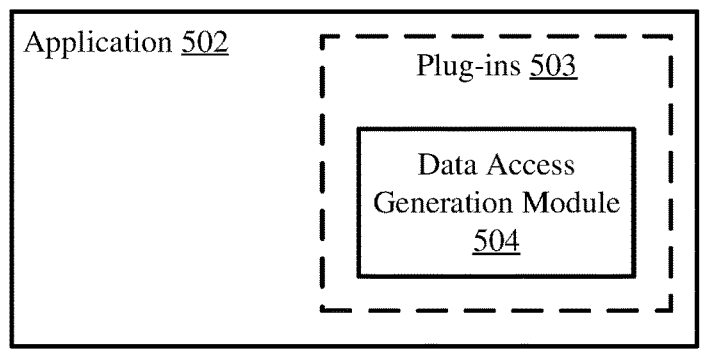
FIG. 5A is an exemplary application environment for a data access generation module.

FIG. 5A is a schematic diagram depicting an application environment for a data access generation module 504, which may provide implementation data access generation functionality, as described herein. An application 502, such as a software application running in a computing environment, may have one or more plug-ins 503 (or add-ins or other software extensions to programs) that add functionality to, or otherwise enhance, the application. The data access generation module 504 may be integrated with the application 502; for example, the data access generation module may be integrated as a plug-in. The data access generation module 504 may add functionality to the application 502 for implementation data access generation functionality, which may be displayed in a user interface or otherwise provided or made available to a user. For example, the application 502 may be a database, a database management application, or an integrated development environment, and the data access generation module 504 may be integrated with the database, data management application, or integrated development environment to provide implementation data access generation functionality.

Figure 5B:
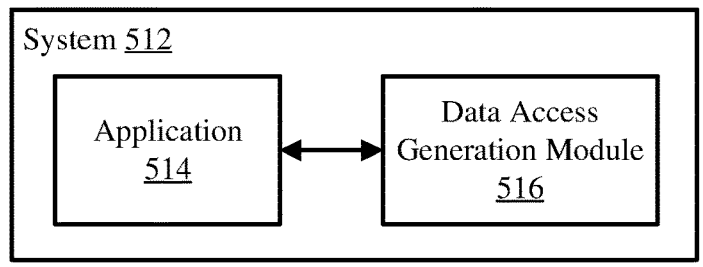
FIG. 5B is an exemplary system environment for a data access generation module.

FIG. 5B is a schematic diagram depicting a system environment for a data access generation module 516, which may provide data access generation functionality, as described herein. The data access generation module 516 may be integrated with a computer system 512. The computer system 512 may include an operating system, or otherwise be a software platform, and the data access generation module 516 may be an application or service running in the operating system or platform, or the data access generation module may be integrated within the operating system or platform as a service or functionality provided through the operating system or platform. The system 512 may be a server or other networked computer or file system. Additionally or alternatively, the data access generation module 516 may communicate with and provide data access generation functionality, as described herein, to one or more applications 514, such as a database, database management applications, or integrated development environment, in the system 512.

Figure 5C:
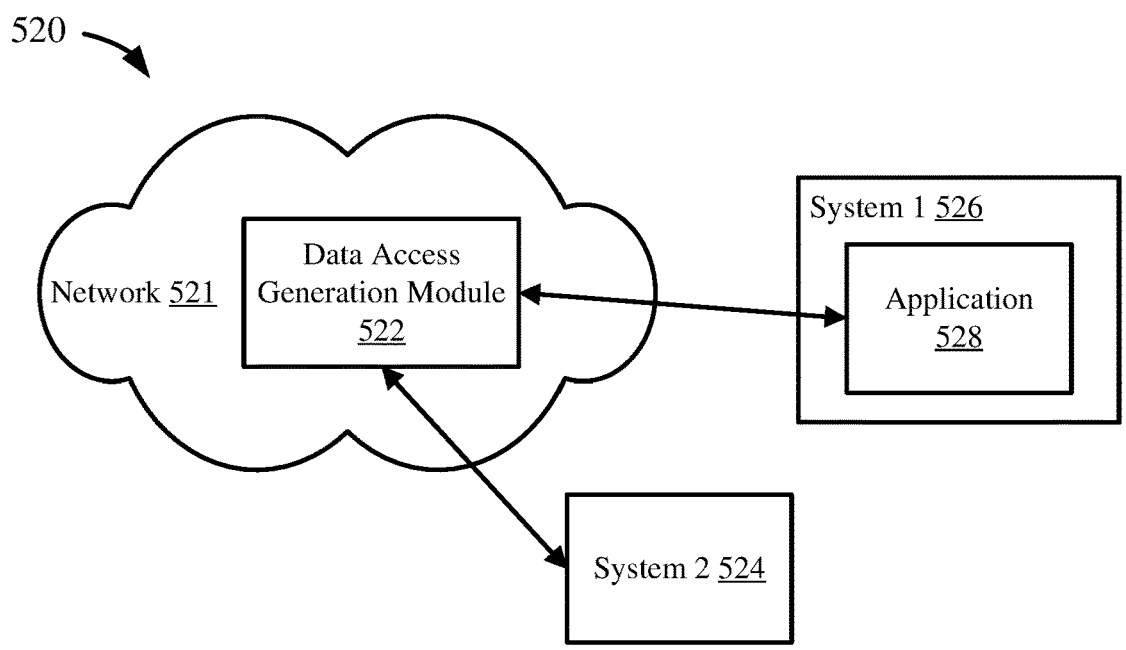
FIG. 5C is an exemplary network environment for a data access generation module.

FIG. 5C is a schematic diagram depicting a network environment 520 for a data access generation module 522, which may provide data access generation functionality, as described herein. The data access generation module 522 may be available on a network 521, or integrated with a system (such as from FIG. 5B) on a network. Such a network 521 may be a cloud network or a local network. The data access generation module 522 may be available as a service to other systems on the network 521 or that have access to the network (e.g., may be on-demand software or SaaS). For example, system 2 524 may be part of, or have access to, the network 521, and so can utilize data access generation functionality from the data access generation module 522. Additionally, system 1526, which may be part of or have access to the network 521, may have one or more applications, such as application 528, that may utilize data access generation functionality from the data access generation module 522.

In these ways, the data access generation module 504, 516, 522 may be integrated into an application, a system, or a network, to provide data access generation functionality, or other data transformation or search definition or search model generation functionality, as described herein.

Example 15—Computing Systems

Figure 6:
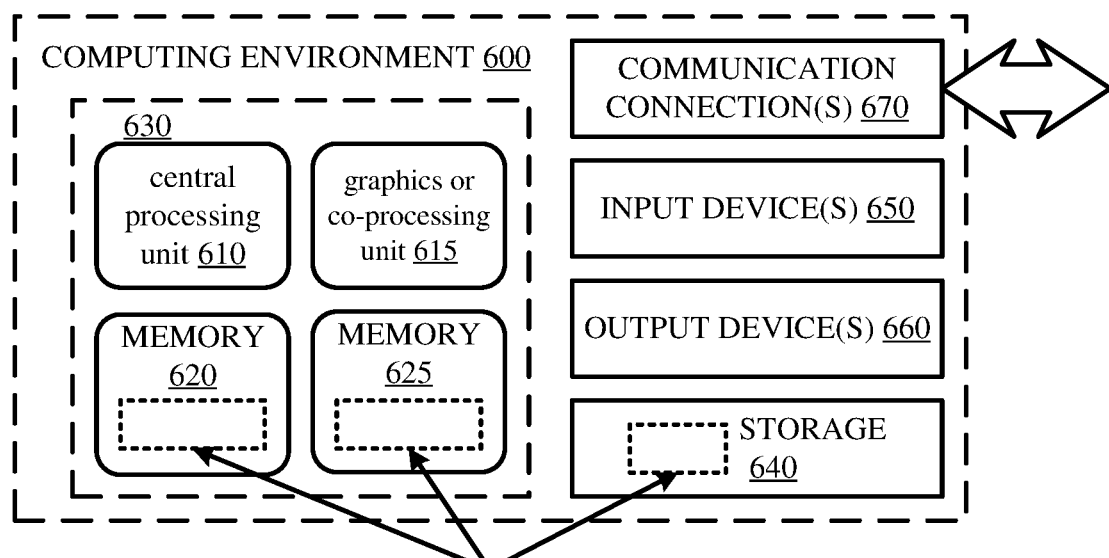
FIG. 6 is a diagram of an example computing system in which described embodiments can be implemented.

FIG. 6 depicts a generalized example of a suitable computing system 600 in which the described innovations may be implemented. The computing system 600 is not intended to suggest any limitation as to scope of use or functionality of the present disclosure, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions, such as for implementing components of the processes of FIGS. 3A-C, the systems of FIGS. 1 and 5A-C, or the data, data representations, or data structures of FIG. 2, and the examples of FIGS. 4A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s) 610, 615. The memory 620, 625 stores software 680 implementing one or more innovations described herein, in the form of computer-executable instructions suitable for execution by the processing unit(s) 610, 615. The memory 620, 625, may also store settings or settings characteristics, databases, data sets, search definitions or representations, or examples shown in FIGS. 2 and 4A-C, the systems shown in FIGS. 1 and 5A-C, or the steps of the processes shown in FIG. 3.

A computing system 600 may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 16—Cloud Computing Environment

Figure 7:
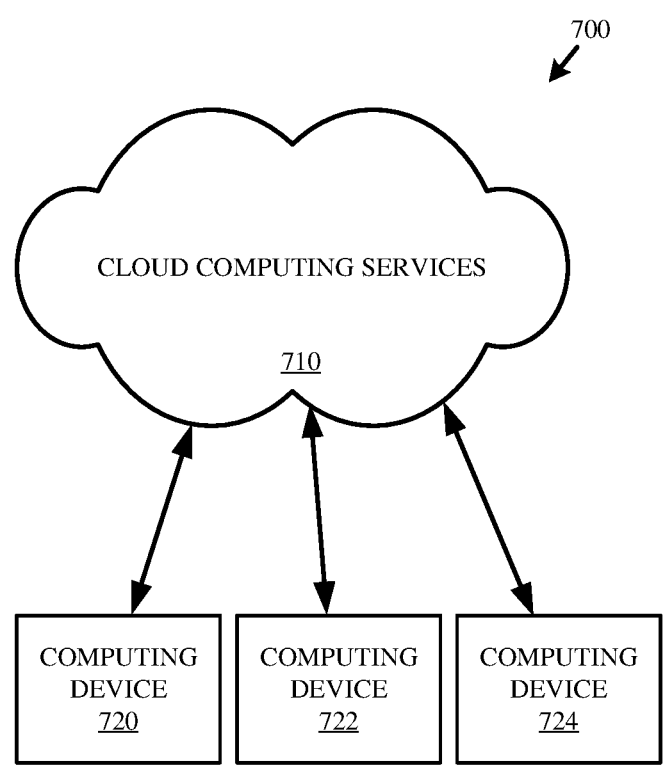
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operations (e.g., data processing, data storage, and the like).

Example 17—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 6, computer-readable storage media include memory 620 and 625, and storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

Example 18—Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method comprising:
identifying a linear data set having a structure for storing one or more records;
determining structural information for the linear data set;
generating a relational data structure based on the structural information determined for the linear data set;
generating database tables based on the relational data structure;
loading the database tables with data from the linear data set to form a relational data set;
restructuring the database tables based on functional dependencies between fields in the database tables;
generating queries for the respective database tables based on the relational data set, wherein the queries provide access to the data in the relational data set;
identifying a primary query of the generated queries, wherein the primary query provides access to a primary set of data in the relational data set;
generating an upper query that references the primary query;
annotating the upper query with execution information for one or more fields in the upper query; and
making the upper query available via a software tool to provide access to the relational data set.

2. The method of claim 1, wherein restructuring the database tables comprises:
   identifying a first functional dependency between a first field and a second field in a given database table;
   generating an additional database table comprising the first field and the second field;
   transferring the data values of the first field and the second field to the additional database table; and
   removing the second field from the given database table.

3. The method of claim 2, wherein generating the additional database table is based on dependency criteria.

4. The method of claim 2, wherein restructuring the database tables comprises:
   calculating a degree of functional dependency of the first functional dependency; and wherein the additional database table is generated based on the degree of functional dependency.

5. The method of claim 2, wherein restructuring the database tables comprises:
   calculating a reducing factor of the first functional dependency; and wherein the additional database table is generated based on the reducing factor.

6. The method of claim 1, wherein generating database tables based on the structural information comprises selecting one or more structural elements of the linear data from the structural information and generating database tables corresponding to the selected one or more structural elements.

7. The method of claim 1, wherein identifying a primary query of the generated queries comprises calculating a number of references for the respective generated queries and selecting the primary query based on the number of references.

8. The method of claim 1, further comprising:
   detecting and cleaning incorrect data in the relational data set.

9. The method of claim 1, further comprising:
   converting one or more fields in the relational data set to a target format based on format criteria.

10. The method of claim 1, wherein the linear data comprises XML data,
    wherein determining the structural information comprises constructing a list of elements present in the XML files and filtering the XML elements to relevant XML elements,
    further wherein generating the database tables comprises creating a set of database tables representing the relevant XML elements in the XML files, wherein creating comprises determining a schema for the XML documents, wherein the schema indicates cardinality among the XML elements, and iterating over the XML elements, wherein, for a given XML element, it is determined whether to create a separate table for the XML element based on cardinality, and
    further wherein restructuring the database tables comprises removing redundancies within the database tables, wherein removing redundancies comprises creating a table with functionally dependent columns of a target table and removing the functionally dependent columns from the target table.

11. One or more non-transitory computer-readable storage media storing computer-executable instructions for causing a computing system to perform a method, the method comprising:
    receiving a data access generation request, wherein the request comprises identifiers for one or more data files storing linear data;
    transforming the linear data into relational data, the transforming comprising generating a relational data structure and storing the linear data in the relational data structure;
    detecting and cleaning incorrect data in the relational data;
    restructuring the relational data based on functional dependencies between fields in the relational data structure;
    converting the relational data into a target format;
    generating one or more search definitions based on the relational data, wherein the search definitions provide access to the relational data;
    generating a search model based on the one or more search definitions, wherein the search model provides enhanced access to the relational data;
    storing the relational data, the one or more search definitions, and the search model; and
    making the search model available as an access mode for the relational data.

12. The one or more non-transitory computer-readable storage media of claim 11, wherein the relational data structure comprises:
    determining structural information comprising structural elements of the linear data;
    selecting one or more structural elements of the structural information;
    generating a relational data schema based on the selected one or more structural elements;
    generating one or more relational objects based on the relational data schema; and
    populating the relational objects based on the linear data.

13. The one or more non-transitory computer-readable storage media of claim 11, wherein restructuring the relational data comprises aggregating redundant data values in the relational data into one or more additional relational objects.

14. The one or more non-transitory computer-readable storage media of claim 13, wherein aggregating redundant data values comprises:
    identifying a functional dependency between a first field and a second field in a target relational object in the relational data;
    generating one of the one or more additional relational objects based on the functional dependency;
    storing data values for the first field and the second field in the one of the one or more additional relational objects; and
    removing the second field from the target relational object.

15. The one or more non-transitory computer-readable storage media of claim 14, wherein aggregating redundant values further comprises:
    calculating a degree of functional dependency for the identified functional dependency; and
    generating the one of the one or more additional relational objects based on the degree of functional dependency.

16. The one or more non-transitory computer-readable storage media of claim 14, wherein aggregating redundant values further comprises:
    calculating a reducing factor for the identified functional dependency; and
    generating the one of the one or more additional relational objects based on the degree of functional dependency.

17. The one or more non-transitory computer-readable storage media of claim 11, wherein the one or more search definitions respectively correspond to one or more relational objects in the relational data.

18. The one or more non-transitory computer-readable storage media of claim 11, wherein generating the search model comprises:
generating the upper search definition based on a primary search definition of the one or more generated search definitions; and
associating one or more search annotations to the upper search definition, wherein the search annotations provide information for executing the upper search definition.

19. A system comprising:
one or more memories;
one or more processing units coupled to the one or more memories; and
one or more computer-readable storage media storing instructions that, when loaded into the one or more memories, cause the one or more processing units to perform operations comprising:
receiving a request to transform linear data, wherein the request comprises identifiers for one or more data files having the linear data;
converting the linear data into relational data, wherein the converting comprises:
identifying structural information of the linear data based on the one or more data files,
selecting one or more key elements based on the structural information,
generating one or more relational data objects of the relational data corresponding to the one or more key elements, and
populating the one or more relational data objects of the relational data with the linear data of the one or more data files based on the structural information;
sanitizing the relational data, wherein the sanitizing comprises:
correcting invalid data values in the relational data, and
correcting extraneous characters in data values in the relational data;
restructuring the relational data, wherein the restructuring comprises:
identifying one or more functional dependencies in the relational data,
generating one or more additional relation data objects of the relational data based on the one or more functional dependencies, and
transferring data from the one or more relational data objects to the one or more additional relational data objects based on the functional dependencies;
converting the relational data into a target format by altering the format of one or more data values in the relational data based on the target format;
generating one or more search definitions based on the relational data in the target format, wherein the one or more search definitions respectively correspond to the one or more relational data objects and the one or more additional relational data objects;
storing the one or more search definitions;
generating a search model based on the one or more search definitions, wherein the search model comprises an upper search definition aggregating the one or more search definitions and one or more search annotations for executing the search model; and
storing the search model.

* * * * *